(12) United States Patent
Murakami

(10) Patent No.: US 11,565,564 B2
(45) Date of Patent: Jan. 31, 2023

(54) SUSPENSION DEVICE AND RECORDING MEDIUM

(71) Applicant: SHOWA CORPORATION, Gyoda (JP)

(72) Inventor: Yosuke Murakami, Fukuroi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 352 days.

(21) Appl. No.: 16/782,629

(22) Filed: Feb. 5, 2020

(65) Prior Publication Data
US 2020/0171906 A1 Jun. 4, 2020

Related U.S. Application Data

(63) Continuation of application No. PCT/JP2017/039372, filed on Oct. 31, 2017.

(30) Foreign Application Priority Data

Oct. 19, 2017 (JP) .............................. JP2017-202898

(51) Int. Cl.
*B60G 17/0165* (2006.01)
*B62J 45/20* (2020.01)
*B62K 25/04* (2006.01)

(52) U.S. Cl.
CPC .......... *B60G 17/0165* (2013.01); *B62J 45/20* (2020.02); *B62K 25/04* (2013.01); *B60G 2400/10* (2013.01); *B60G 2500/10* (2013.01)

(58) Field of Classification Search
CPC ............ B60G 17/0165; B60G 2400/10; B60G 2500/10; B60G 2400/102;
(Continued)

(56) References Cited

U.S. PATENT DOCUMENTS

| 2006/0054375 A1* | 3/2006 | Kakinuma ............. B60K 28/14 |
| | | 180/282 |
| 2007/0061107 A1* | 3/2007 | Vock ......................... G04F 8/08 |
| | | 702/182 |

(Continued)

FOREIGN PATENT DOCUMENTS

| CN | 109764078 A | * | 5/2019 | ......... B60G 17/0164 |
| CN | 113165466 A | * | 7/2021 | ......... B60G 17/0162 |

(Continued)

OTHER PUBLICATIONS

Japanese Office Action dated Mar. 27, 2018 for the corresponding Japanese Patent Application No. 2017-202898.
(Continued)

*Primary Examiner* — Drew J Brown
(74) *Attorney, Agent, or Firm* — Leason Ellis LLP; Melvin C. Garner; Edward J. Ellis

(57) ABSTRACT

A suspension device includes: a damping device that damps a force generated between a vehicle body and a wheel of a vehicle; a determination unit that determines whether the vehicle is jumping, using an acceleration of the vehicle in a front-rear direction, an acceleration of the vehicle in a left-right direction, and an acceleration of the vehicle in a vertical direction; and a damping force control unit that increases a damping force of the damping device so as to be greater than the damping force generated when the determination unit does not determine that the vehicle is jumping, when the determination unit determines that the vehicle is jumping.

13 Claims, 30 Drawing Sheets

(58) Field of Classification Search
CPC .......... B60G 2400/104; B60G 17/0161; B60G 2300/12; B60G 2400/106; B60G 2400/252; B60G 2400/82; B60G 2500/114; B60G 2600/02; B60G 2600/122; B60G 2600/604; B60G 2600/70; B60G 2800/91; B60G 17/06; B60G 17/08; B62J 45/20; B62J 45/40; B62J 45/4152; B62K 25/04; B62K 11/04
See application file for complete search history.

(56) References Cited

U.S. PATENT DOCUMENTS

| | | | |
|---|---|---|---|
| 2007/0208530 A1* | 9/2007 | Vock | G01P 3/42 702/141 |
| 2008/0306653 A1 | 12/2008 | Hasegawa | |
| 2015/0057885 A1 | 2/2015 | Brady et al. | |
| 2015/0081171 A1 | 3/2015 | Ericksen et al. | |
| 2018/0154729 A1 | 6/2018 | Awano | |
| 2019/0072149 A1 | 3/2019 | Awano et al. | |
| 2019/0110717 A1 | 4/2019 | Ohyama et al. | |

FOREIGN PATENT DOCUMENTS

| | | | | |
|---|---|---|---|---|
| IT | 102013902126821 A1 | 8/2014 | | |
| JP | 02-182518 A | 7/1990 | | |
| JP | 2008-144685 A | 6/2008 | | |
| JP | 2012-033266 A | 2/2012 | | |
| JP | 2012-217584 A | 11/2012 | | |
| JP | 2013-225773 A | 10/2013 | | |
| JP | 2015-012579 A | 1/2015 | | |
| JP | 2015-051756 A | 3/2015 | | |
| JP | 2017-030577 A | 2/2017 | | |
| JP | 2017-165298 A | 9/2017 | | |
| JP | 6378413 B1 * | 8/2018 | ......... B60G 17/0165 |
| JP | 6444472 B1 * | 12/2018 | ......... B60G 17/0161 |
| WO | WO-2017/175720 A1 | 10/2017 | | |
| WO | WO-2021044552 A1 * | 3/2021 | ........... B60G 17/016 |
| WO | WO-2021066819 A1 * | 4/2021 | ............. B62J 50/21 |
| WO | WO-2021260791 A * | 12/2021 | ............. B62K 25/04 |

OTHER PUBLICATIONS

International Search Report dated Jan. 16, 2018 for the corresponding PCT International Application No. PCT/JP2017/039372.
Written Opinion of the International Searching Authority dated Jan. 16, 2018 for the corresponding PCT International Application No. PCT/JP2017/039372.
Extended European Search Report dated Jun. 24, 2021 for the corresponding European Patent Application No. 17929084.6.
European Office Action dated Dec. 1, 2022 for the corresponding European Patent Application No. 17929084.6 (10 pages).

* cited by examiner

SUSPENSION DEVICE AND RECORDING MEDIUM

CROSS-REFERENCE TO RELATED APPLICATION(S)

This application is a continuation of PCT application No. PCT/JP2017/039372, which was filed on Oct. 31, 2017, which claims the benefit of priority to Japanese Patent Application No. 2017-202898 filed on Oct. 19, 2017, the contents of which are incorporated herein by reference.

TECHNICAL FIELD

The present invention relates to a suspension device and a recording medium.

BACKGROUND ART

Techniques have been proposed to vary damping force of a suspension at the time of landing from a jump.

For example, the control device described in PTL 1 includes: an acceleration detection means for detecting an acceleration component of gravitational acceleration of a vehicle in a predetermined direction; a jump determination means for determining whether the vehicle has jumped based on the acceleration component detected by the acceleration detection means; an adjustment mechanism that electromagnetically changes the damping force of the suspension; suspension control means for varying the damping force of the suspension by the adjustment mechanism based on the determination result by the jump determination means.

PTL 1: JP-A-2008-144685

It is desirable that the suspension device is capable of absorbing the energy associated with a jump at the time of landing from a jump of a vehicle. This is because when the suspension device is contracted without being able to absorb energy, there is a possibility that the steering may be adversely affected. Meanwhile, in preparation for frequent use of jumps, it is possible to configure the settings, such as, increase the damping force of the damping device, or the like, but there is a risk that the settings may deteriorate ride comfort during normal traveling.

It is an object of the present invention to provide a suspension device and the like that can improve the steering performance at the time of landing from a jump without deteriorating the ride comfort during normal traveling.

SUMMARY OF INVENTION

According to the present invention, there is provided a suspension device including a damping device that damps a force generated between a vehicle body and a wheel of a vehicle, a determination unit that determines whether the vehicle is jumping, using an acceleration of the vehicle in a front-rear direction, an acceleration of the vehicle in a left-right direction, and an acceleration of the vehicle in a vertical direction, and a damping force control unit that, when the determination unit determines that the vehicle is jumping, increases a damping force of the damping device so as to be greater than that when the determination unit does not determine that the vehicle is jumping.

In the present example, the determination unit may determine that the vehicle is jumping when a resultant acceleration for which the acceleration in the front-rear direction, the acceleration in the left-right direction, and the acceleration in the vertical direction are combined is less than a predetermined value, or when a period of the resultant acceleration being less than the predetermined value continues for a predetermined period.

The determination unit may determine whether the vehicle is jumping also considering a length between the vehicle body and the wheel.

At the time of jumping when the determination unit determines that the vehicle is jumping, the damping force control unit may increase the damping force in a compression direction such that a relative displacement between the vehicle body and the wheel is less than at the time of normal traveling when the determination unit does not determine that the vehicle is jumping.

Until a predetermined reference period elapses after the landing from a jump of the vehicle, the damping force control unit may increase the damping force in an extension direction in which the relative displacement between the vehicle body and the wheel is greater than the relative displacement at the time of the normal traveling.

The damping force control unit may vary a magnitude of the damping force of the damping device according to a height of the jump.

The damping force control unit may stop increasing the damping force of the damping device when the predetermined reference period elapses after the landing from a jump of the vehicle.

At the time of the jumping when the determination unit determines that the vehicle is jumping, the damping force control unit may increase the damping force of the damping device on a front wheel side and the damping device on a rear wheel side such that the damping force of the damping device on the front wheel side is greater than the damping force of the damping device on the rear wheel side.

The present invention relates to a non-transitory computer readable recording medium storing a program that causes a computer to implement a function of determining whether a vehicle is jumping, using an acceleration of the vehicle in a front-rear direction, an acceleration of the vehicle in a left-right direction, and an acceleration of the vehicle in a vertical direction, and, when it is determined that the vehicle is jumping, a function of increasing a damping force of a damping device that damps a force generated between a vehicle body and a wheel of the vehicle than when it is not determined that the vehicle is jumping.

According to the present invention, the steering performance at the time of landing from a jump can be improved without deteriorating ride comfort during normal traveling.

DESCRIPTION OF EMBODIMENTS

Hereinafter, embodiments of the present invention will be described in detail with reference to the attached drawings.

First Embodiment

Figure 1:
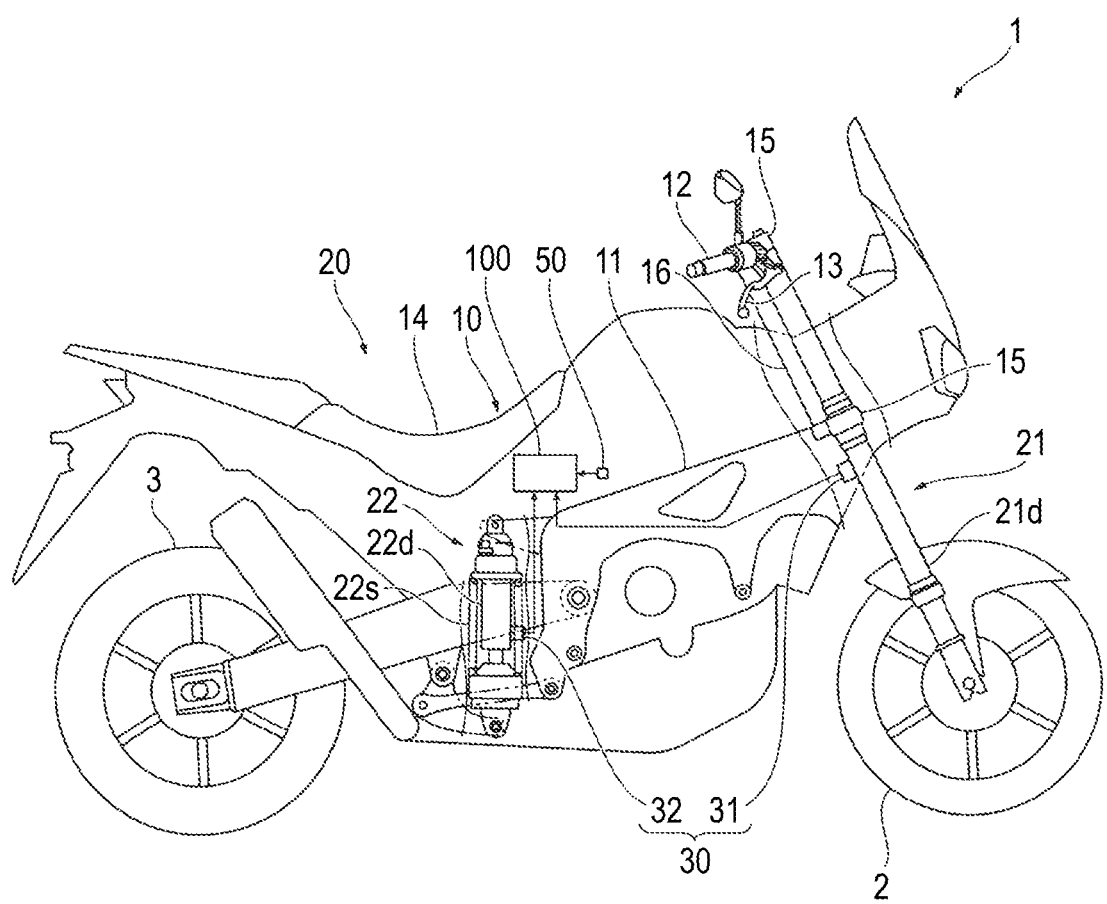
FIG. 1 is a diagram illustrating a schematic configuration of a motorcycle 1 according to a first embodiment.

FIG. 1 is a diagram illustrating a schematic configuration of a motorcycle 1 according to the first embodiment.

Figure 2:
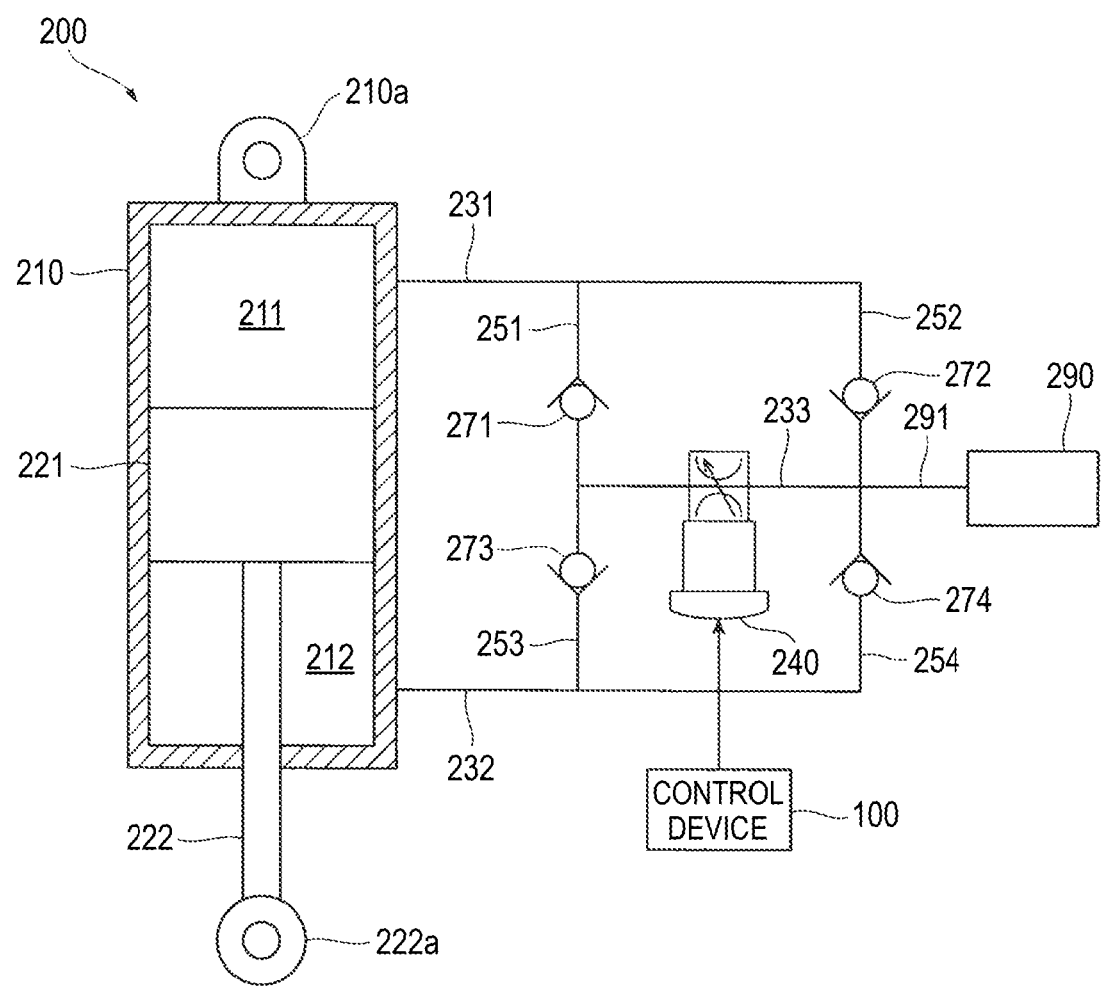
FIG. 2 is a diagram illustrating a schematic configuration of a damping device 200.

FIG. 2 is a diagram illustrating a schematic configuration of a damping device 200.

Figure 3:
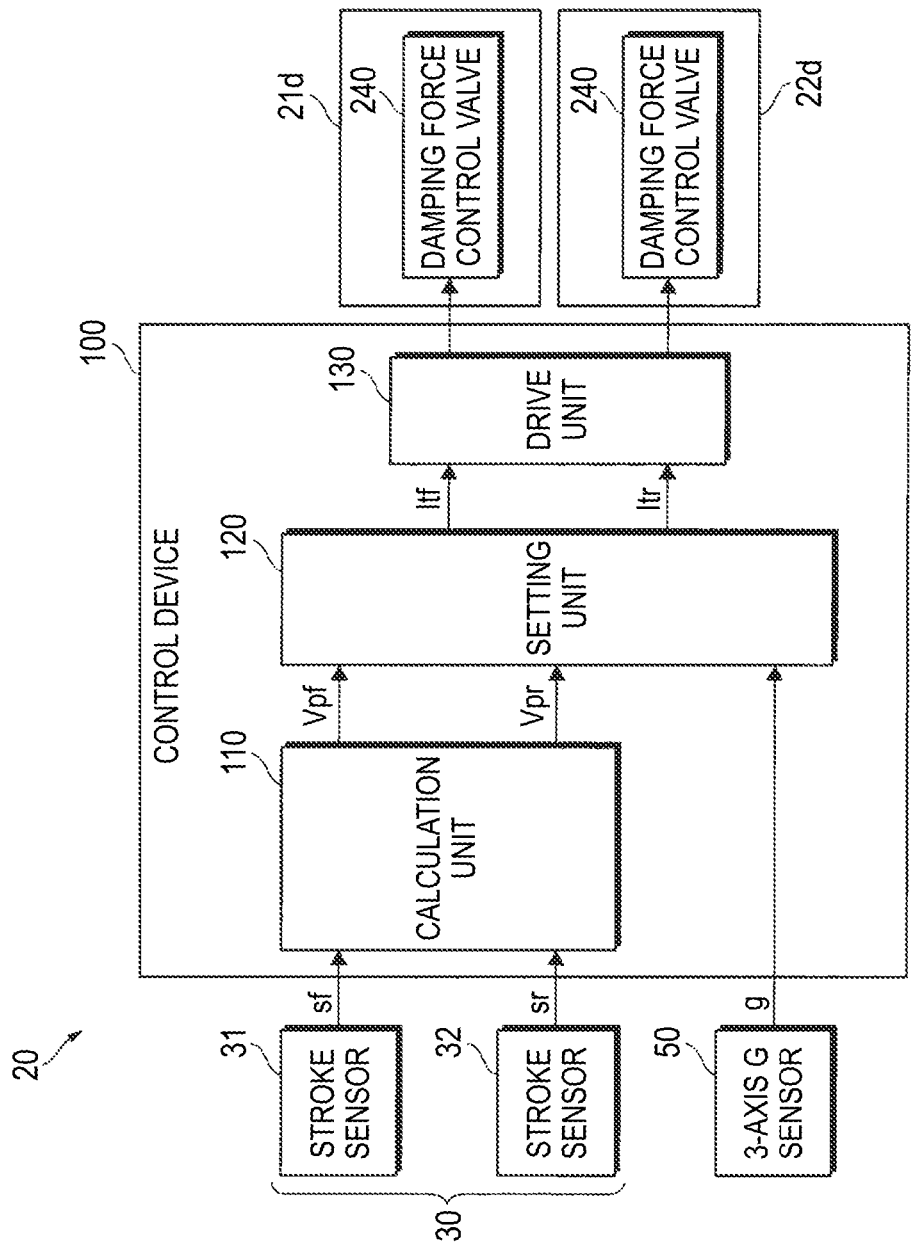
FIG. 3 is a diagram illustrating a schematic configuration of a control device 100.

FIG. 3 is a diagram illustrating a schematic configuration of a control device 100.

The motorcycle 1 includes a wheel on a front side, that is, a front wheel 2, a wheel on the rear side, that is, a rear wheel 3, and a vehicle body 10. The vehicle body 10 includes a vehicle body frame 11 which forms a framework of the motorcycle 1, a handle 12, a brake lever 13, a seat 14, and the like.

The motorcycle 1 includes a suspension 21 on the front wheel side, which connects the front wheel 2 and the vehicle body 10. The motorcycle 1 includes two brackets 15 for holding a suspension 21 disposed on the left side of the front wheel 2 and a suspension 21 disposed on the right side of the front wheel 2, and a shaft 16 disposed between the two brackets 15. The shaft 16 is rotatably supported by the vehicle body frame 11. The suspension 21 includes a suspension spring (not illustrated) that absorbs an impact applied to the front wheel 2 from a road surface or the like and a damping device 21d that damps the vibration of the suspension spring.

The motorcycle 1 includes a suspension 22 on the rear wheel side. The suspension 22 includes a suspension spring 22s that absorbs an impact applied to the rear wheel 3 from the road surface or the like and a damping device 22d that damps the vibration of the suspension spring 22s. The damping device 22d damps the force generated between the rear wheel 3 and the vehicle body 10.

In the following description, the damping device 21d and the damping device 22d may sometimes be collectively referred to as "damping device 200".

The suspension 21 on the front wheel side and the suspension 22 on the rear wheel side may sometimes be collectively referred to as "suspension". The front wheel 2 and the rear wheel 3 may sometimes be collectively referred to as "wheels".

The motorcycle 1 includes a control device 100 that controls the damping force of the damping device 21d and the damping device 22d. The control device 100 receives output signals from a stroke sensor 31 that measures an amount of extension and contraction of the suspension 21 and a stroke sensor 32 that measures an amount of extension and contraction of the suspension 22. In the following description, the stroke sensor 31 and the stroke sensor 32 may sometimes be collectively referred to as a "stroke sensor 30". The control device 100 also receives an output signal g from a 3-axis G sensor 50 that measures the acceleration Gx of the motorcycle 1 in the front-rear direction, the acceleration Gy thereof in the left-right direction, and the acceleration Gz thereof in the vertical direction.

A suspension device 20 according to the present invention is a device having suspensions (the suspension 21 and the suspension 22) and the control device 100.

(Damping Device)

The damping device 200 includes a cylinder 210 filled with hydraulic fluid, a piston 221 movably accommodated in the cylinder 210, and a piston rod 222 for holding the piston 221. An end 210a of one side (upper side in FIG. 2) of the cylinder 210 is connected to the vehicle body 10. The piston rod 222 includes one end holding the piston 221, and the other end 222a (lower side in FIG. 2) connected to the wheel. The damping device according to the present invention is not limited to the present form. In the damping device according to the present invention, the other end of the cylinder 210 may be connected to the wheel, the other end of the piston rod 222 may hold the piston 221, and the one end of the piston rod 222 may be connected to the vehicle body 10.

In the damping device 200, the piston 221 moves toward the vehicle body 10 (upper side in FIG. 2) to perform a compression stroke in which the entire length of the damping device 200 is contracted, and the piston 221 moves toward the wheel (lower side in FIG. 2) to perform an extension stroke in which the entire length of the damping device 200 is extended.

The cylinder 210 is of a type that has the piston 221 accommodated in the cylinder 210, and that is partitioned into a compression-side oil chamber 211 where the pressure of the hydraulic fluid increases in the compression stroke, and an extension-side oil chamber 212 where the pressure of the hydraulic fluid increases in the extension stroke.

The damping device 200 includes a first oil passage 231 connected to the oil chamber 211 in the cylinder 210 and a second oil passage 232 connected to the oil chamber 212 in the cylinder 210. The damping device 200 includes a third oil passage 233 provided between a first oil passage 231 and a second oil passage 232, and a damping force control valve 240 provided in the third oil passage 233. The damping device 200 includes a first branch passage 251 connecting the first oil passage 231 and one end of the third oil passage 233, and a second branch passage 252 connecting the first oil passage 231 and the other end of the third oil passage 233. The damping device 200 includes a third branch passage 253 connecting the second oil passage 232 and one end of the third oil passage 233, and a fourth branch passage 254 connecting the second oil passage 232 and the other end of the third oil passage 233.

The damping device 200 includes a first check valve 271 that is provided on the first branch passage 251, allows the movement of the hydraulic fluid from the first oil passage 231 to the third oil passage 233, and restricts the movement of the hydraulic fluid from the third oil passage 233 toward the first oil passage 231. The damping device 200 includes a second check valve 272 that is provided on the second branch passage 252, allows the movement of the hydraulic fluid from the third oil passage 233 to the first oil passage 231, and restricts the movement of the hydraulic fluid from the first oil passage 231 toward the third oil passage 233.

The damping device 200 includes a third check valve 273 that is provided on the third branch passage 253, allows the movement of the hydraulic fluid from the second oil passage 232 to the third oil passage 233, and restricts the movement of the hydraulic fluid from the third oil passage 233 toward the second oil passage 232. The damping device 200 includes a fourth check valve 274 that is provided on the fourth branch passage 254, allows the movement of the hydraulic fluid from the third oil passage 233 to the second oil passage 232, and restricts the movement of the hydraulic fluid from the second oil passage 232 toward the third oil passage 233.

The damping device 200 includes a reservoir 290 having a function of storing the hydraulic fluid and supplying and discharging the hydraulic fluid, and a reservoir passage 291 connecting the reservoir 290 and the other end of third oil passage 233.

The damping force control valve 240 includes a solenoid and energizes the solenoid. By controlling the amount of current, it is possible to control the pressure of hydraulic fluid passing through the valve. The damping force control valve 240 according to the present embodiment increases the pressure of the hydraulic fluid passing through the valve as the amount of current supplied to the solenoid increases. The amount of current for energizing the solenoid is controlled by the control device 100.

When the piston 221 moves toward the oil chamber 211, the hydraulic pressure in the oil chamber 211 is increased. Then, the hydraulic fluid in the oil chamber 211 flows to the damping force control valve 240 through the first oil passage 231 and the first branch passage 251. The pressure of the hydraulic fluid passing through the damping force control valve 240 is adjusted by the valve pressure of the damping force control valve 240, so that the damping force on the compression side is adjusted. The hydraulic fluid that has passed the damping force control valve 240 flows into the oil chamber 212 through the fourth branch passage 254 and the second oil passage 232.

On the other hand, when the piston 221 moves toward the oil chamber 212, the hydraulic pressure in the oil chamber 212 is increased. Then, the hydraulic fluid in the oil chamber 212 flows to the damping force control valve 240 through the second oil passage 232 and the third branch passage 253. The pressure of the hydraulic fluid passing through the damping force control valve 240 is adjusted by the valve pressure of the damping force control valve 240, so that the damping force on the extension side is adjusted. The hydraulic fluid that has passed the damping force control valve 240 flows into the oil chamber 211 through the second branch passage 252 and the first oil passage 231.

(Control Device 100)

The control device 100 is an arithmetic logic operation circuit including a CPU, a ROM, a RAM, a backup RAM, and the like.

The control device 100 receives a stroke signal sf on the front wheel side, which is an output signal converted from the amount of extension and contraction of the suspension 21 measured by the stroke sensor 31, and a stroke signal sr on the rear wheel side, which is an output signal converted from the amount of extension and contraction of the suspension 22 measured by the stroke sensor 32. An output signal g or the like from the 3-axis G sensor 50 is also input to the control device 100.

The control device 100 controls the amount of current to be supplied to the solenoid of the damping force control valve 240 to control the damping force. Specifically, for increasing the damping force, the control device 100 increases the amount of current to be supplied to the solenoid of the damping force control valve 240, and for reducing the damping force, the control device 100 reduces the amount of current to be supplied to the solenoid of the damping force control valve 240.

The control device 100 includes a calculation unit 110 that calculates stroke speeds Vpf and Vpr which are the changed speeds of the stroke measured by the stroke sensor 30. The control device 100 includes a setting unit 120 that sets target currents Itf and Itr to be supplied to the solenoid of the damping force control valve 240 based on the stroke speeds Vpf and Vpr calculated by the calculation unit 110. The control device 100 includes a drive unit 130 that drives the damping force control valve 240. In the present example, the setting unit 120 sets the target currents Itf and Itr in order to set the damping force of the suspension to a damping force of a target magnitude. Then, the control device 100 controls the drive unit 130 such that the target currents Itf and Itr set by the setting unit 120 are supplied to the solenoid.

The calculation unit 110 calculates the stroke speed Vpf on the front wheel side by differentiating the output value from the stroke sensor 31. The calculation unit 110 calculates the stroke speed Vpr on the rear wheel side by differentiating the output value from the stroke sensor 32. The stroke speed Vpf and the stroke speed Vpr may be sometimes collectively referred to as "stroke speed Vp".

The drive unit 130 includes a transistor (field effect transistor: FET) as a switching element connected between the positive side line of the power supply and the coil of the solenoid of the damping force control valve 240, for example.

More specifically, the drive unit 130 causes the transistor to switch such that a target current supplied to the damping force control valve 240 of the damping device 21d is the target current Itf set by the setting unit 120. The drive unit 130 causes the transistor to switch such that a target current supplied to the damping force control valve 240 of the damping device 22d is the target current Itr set by the setting unit 120.

(Setting Unit 120)

During normal traveling when the motorcycle 1 travels with the front wheel 2 and the rear wheel 3 in contact with the road surface, the setting unit 120 sets the target current Itf on the front wheel side using the stroke speed Vpf calculated by the calculation unit 110. During the normal traveling, the setting unit 120 sets the target current Itr on the rear wheel side using the stroke speed Vpr calculated by the calculation unit 110. Note that the method of setting the target current Itf by the setting unit 120 is the same as the method of setting the target current Itr by the setting unit 120. Hereinafter, the target current Itf and the target current Itr may be sometimes collectively referred to as a "target current It".

Meanwhile, during a jump of the motorcycle 1 in which the front wheel 2 and the rear wheel 3 are lifted off from the road surface, the setting unit 120 sets the target current It without using the stroke speed Vp.

Hereinafter, the setting unit 120 will be described in more detail.

Figure 4:
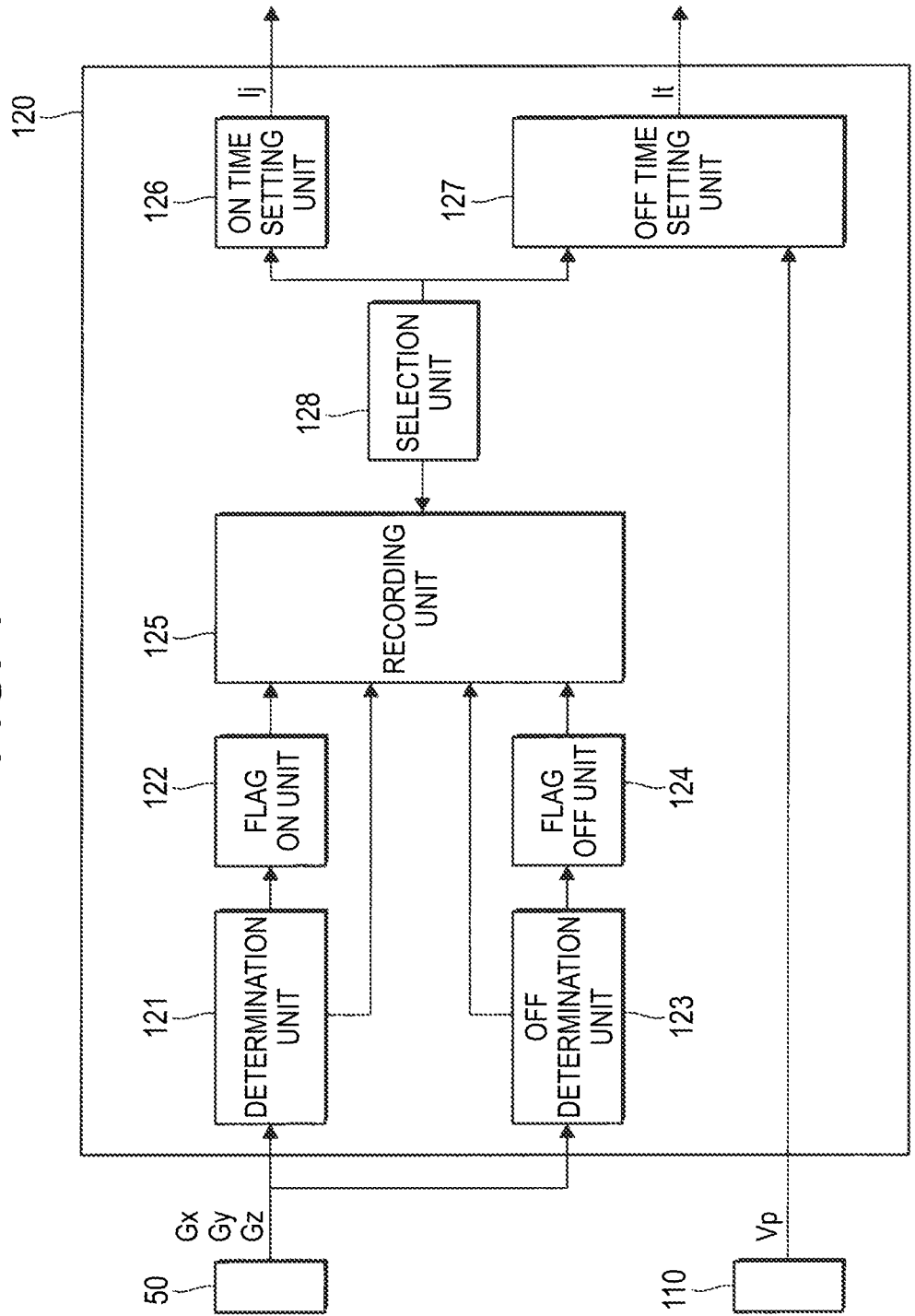
FIG. 4 is a diagram illustrating a schematic configuration of a setting unit 120.

FIG. 4 is a diagram illustrating a schematic configuration of the setting unit 120.

The setting unit 120 includes a determination unit 121 that determines whether the motorcycle 1 is jumping with the front wheel 2 and the rear wheel 3 being lifted off from the road surface.

When the determination unit 121 determines that the vehicle is jumping, the setting unit 120 includes a flag ON unit 122 that sets a jump flag to ON, which is a flag indicating that the vehicle is jumping.

The setting unit 120 includes an OFF determination unit 123 that determines whether to set the jump flag to OFF.

The setting unit 120 includes a flag OFF unit 124 that sets the jump flag to OFF when the OFF determination unit 123 determines to set the jump flag to OFF.

The setting unit 120 includes a recording unit 125 that records the state as to whether the jump flag is ON or OFF. The recording unit 125 may be exemplified as a predetermined flag recording area provided in the RAM of the control device 100.

The setting unit 120 includes an ON time setting unit 126 that sets the target current It when the jump flag is ON.

The setting unit 120 includes an OFF time setting unit 127 that sets the target current It when the jump flag is OFF.

The setting unit 120 includes a selection unit 128 that selects any one of the ON time setting unit 126 and the OFF time setting unit 127 when setting the target current It.

When the jump flag recorded in the recording unit 125 is OFF, the determination unit 121 uses the acceleration Gx in the front-rear direction, the acceleration Gy in the left-right direction, and the acceleration Gz in the vertical direction measured by the 3-axis G sensor 50 to determine whether the motorcycle 1 is jumping. The method of the determination unit 121 for determining whether the motorcycle 1 is jumping will be described below in detail. The determination unit 121 may determine whether the vehicle is jumping using the acceleration Gx, the acceleration Gy, and the acceleration Gz that are measured by the 3-axis G sensor 50 and extracted by the low pass filter. The low pass filter is a filter that removes frequency band components greater than a predetermined frequency (for example, 5 Hz) and extracts only low frequency band components less than the predetermined frequency.

The flag ON unit 122 sets the jump flag to ON when the determination unit 121 determines that the vehicle is jumping.

The OFF determination unit 123 determines whether to set the jump flag to OFF when the jump flag recorded in the recording unit 125 is ON. The method of the determination unit 123 for determining whether to set the jump flag to OFF will be described in detail below.

When the OFF determination unit 123 determines to set the jump flag to OFF, the flag OFF unit 124 sets the jump flag to OFF.

The ON time setting unit 126 sets the target current It to an ON time current Ij which is set in advance based on an amount of current of when the jump flag is ON. The ON time current Ij is a current greater than the current (target current It set by the OFF time setting unit 127) supplied during normal traveling, i.e., traveling with the front wheel 2 and rear wheel 3 in contact with the road surface, and may be exemplified as the current that can maximize the damping force of damping device 200. The ON time current Ij may be exemplified as the maximum current that can be supplied to the solenoid of the damping force control valve 240.

As described above, the ON time setting unit 126 serves as an example of the damping force control unit, which makes the damping force of the damping device 200 greater than the damping force generated during normal traveling by setting the ON time current Ij as the target current It.

Figure 5:
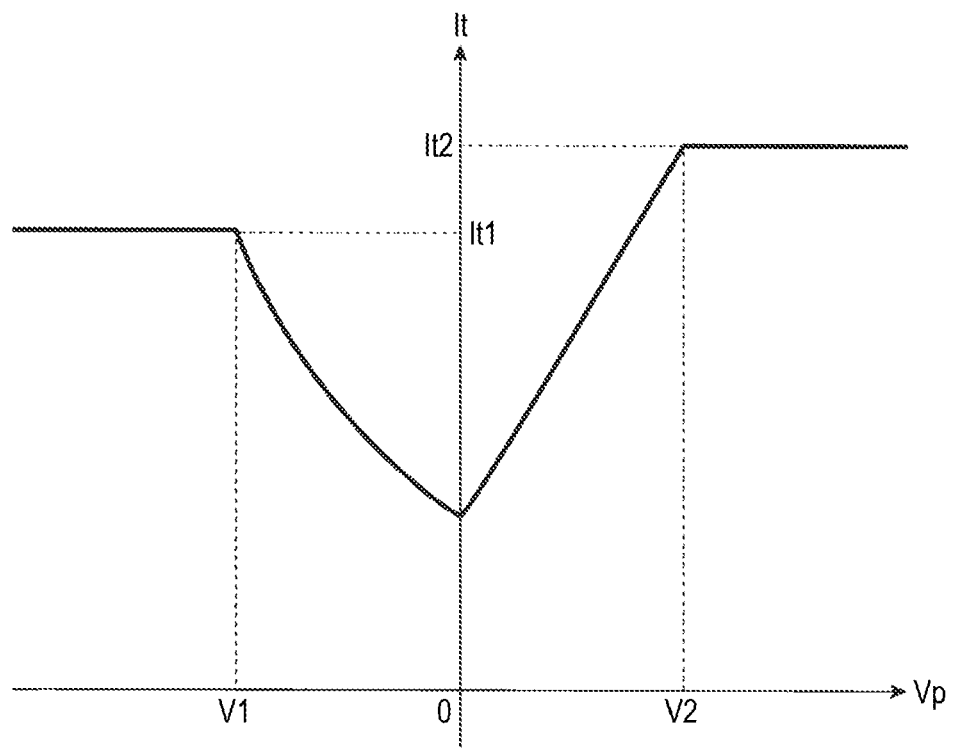
FIG. 5 is a schematic view of a control map illustrating an example of relationship between a target current and a stroke speed.

FIG. 5 is a schematic view of a control map illustrating an example of the relationship between the target current It and the stroke speed Vp.

The OFF time setting unit 127 calculates the target current It according to the stroke speed Vp (stroke speed Vpf or stroke speed Vpr). For example, the OFF time setting unit 127 substitutes the stroke speed Vp into the control map illustrated in FIG. 5 illustrating the relationship between the target current It and the stroke speed Vp, which is heuristically created in advance and recorded in the ROM, to calculate the target current It.

In the control map illustrated in FIG. 5, when the stroke speed Vp is the speed in the compression direction of the suspension, and when the stroke speed Vp is equal to or greater than a first predetermined speed V1, the target current It is set greater as the stroke speed Vp is less. When the stroke speed Vp is less than the first predetermined speed V1, the target current It is set to be a predetermined current It1 in the compression direction. When the stroke speed Vp is a speed in the extension direction of the suspension, and when the stroke speed Vp is equal to or less than a second predetermined speed V2, the target current It is set greater as the stroke speed Vp is greater. When the stroke speed Vp is greater than the second predetermined speed V2, the target current It is set to be a predetermined current It2 in the extension direction. Note that the OFF time setting unit 127 may switch and use the control map indicating the relationship between the target current It and the stroke speed Vp, according to a vehicle speed which is the moving speed of the motorcycle 1.

The OFF time setting unit 127 controls the damping force of the damping device 200 such, by setting the target current It.

The selection unit 128 selects the ON time setting unit 126 as an element for setting the target current It when the jump flag is ON, and selects the OFF time setting unit 127 as an element for setting the target current It when the jump flag is OFF.

(Determination Method)

Next, a method of the determination unit 121 for determining whether the motorcycle 1 is jumping will be described.

First, measurement values of the 3-axis G sensor 50 when the motorcycle 1 is jumping and before and after the jump will be described.

Figure 6A:
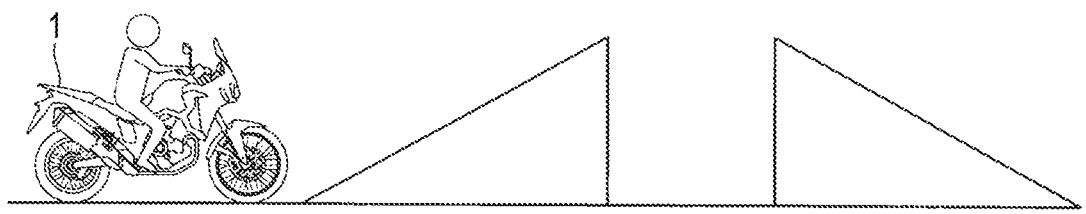
FIG. 6A is a view illustrating a state when the motorcycle 1 is traveling on a flat road.
Figure 6B:
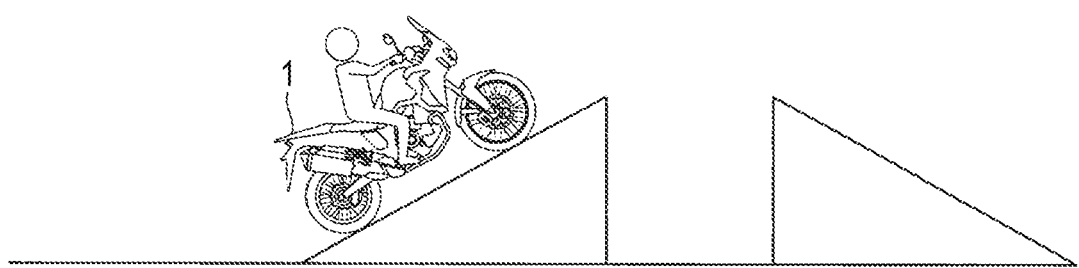
FIG. 6B is a view illustrating a state when the motorcycle 1 is traveling on an uphill slope.
Figure 6C:
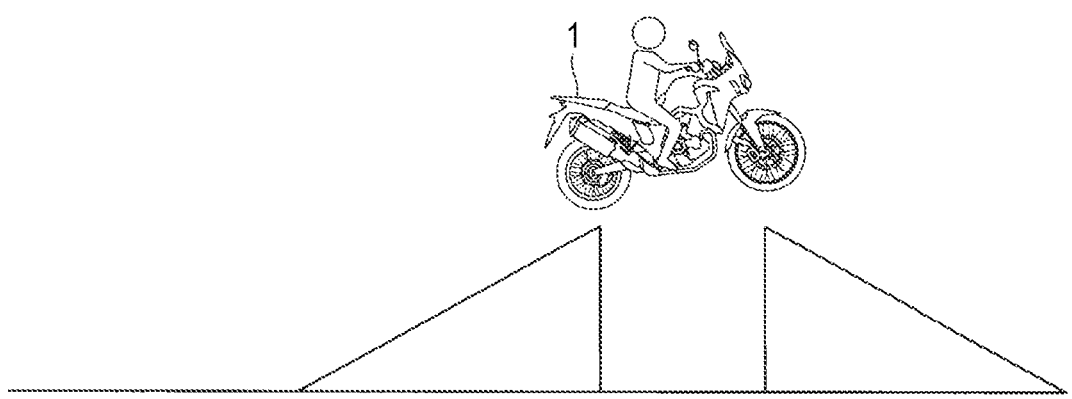
FIG. 6C is a view illustrating a state when the motorcycle 1 is jumping.
Figure 6D:
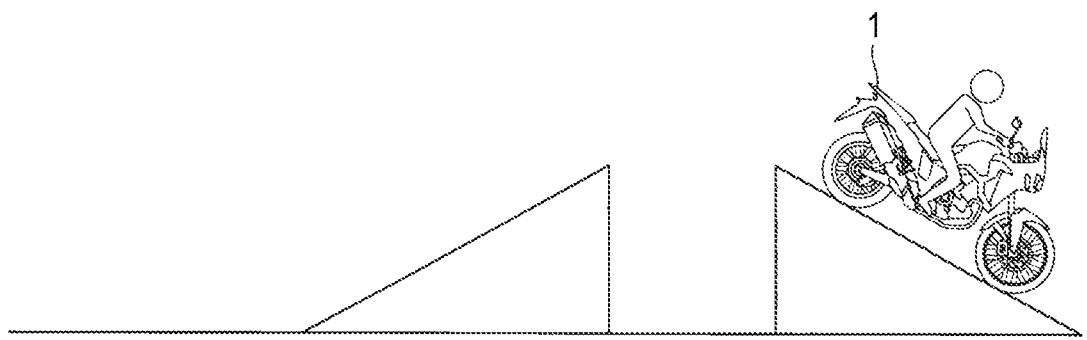
FIG. 6D is a view illustrating a state when the motorcycle 1 lands on a descending slope.

FIG. 6A is a view illustrating a state when the motorcycle 1 is traveling on a flat road. FIG. 6B is a view illustrating a state when the motorcycle 1 is traveling on an uphill slope. FIG. 6C is a view illustrating a state when the motorcycle 1 is jumping. FIG. 6D is a view illustrating a state when the motorcycle 1 lands on a descending slope.

Figure 7:
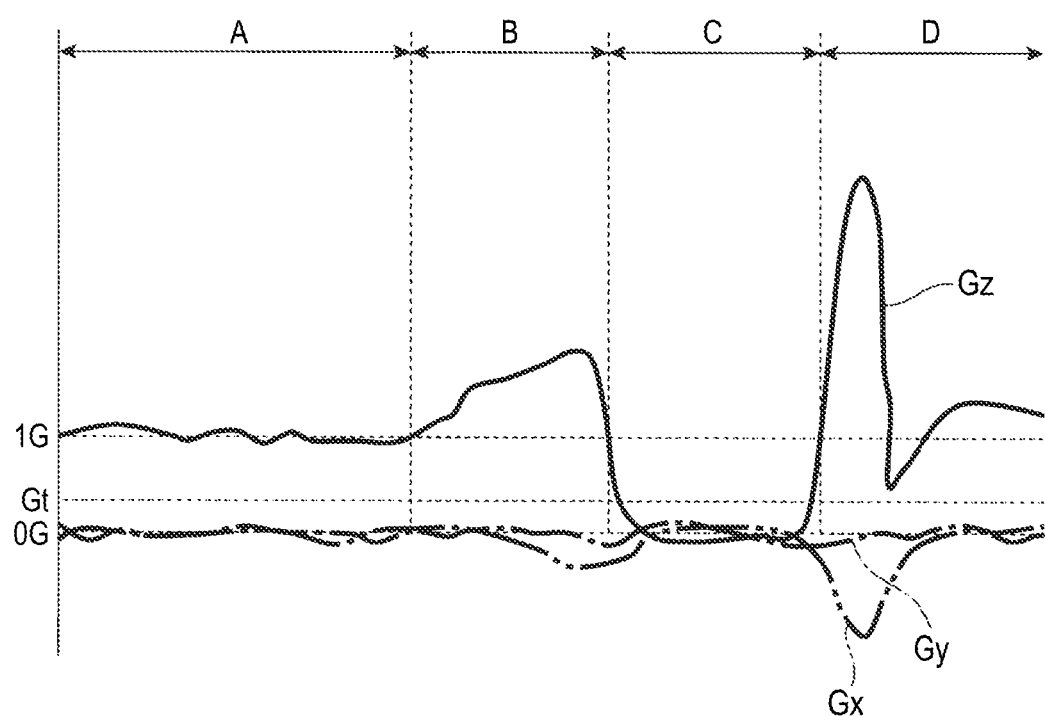
FIG. 7 is a view illustrating values of accelerations Gx, Gy and Gz measured by a 3-axis G sensor when the motorcycle 1 is in the states of FIGS. 6A to 6D.

FIG. 7 is a view illustrating values of accelerations Gx, Gy and Gz measured by the 3-axis G sensor 50 when the motorcycle 1 is in the states of FIGS. 6A to 6D.

As illustrated in FIG. 6A, during normal traveling when the motorcycle 1 travels normally with the front wheel 2 and the rear wheel 3 in contact with the road surface and also travels on a flat road at a constant speed, the 3-axis G sensor 50 measures the gravitational acceleration (1 G=9.8 (m/s$^2$)) in the positive direction as acceleration Gz, as illustrated in section A in FIG. 7.

As illustrated in FIG. 6B, when the motorcycle 1 is traveling on the uphill slope while accelerating in preparation for a jump, as illustrated in section B of FIG. 7, the 3-axis G sensor 50 measures, for the acceleration Gz, a value obtained by increasing the equivalent acceleration in the direction of the gravitational acceleration G. When the motorcycle 1 is traveling uphill slope while accelerating in preparation for a jump, the 3-axis G sensor 50 measures, for the acceleration Gx, a value corresponding to the acceleration of the motorcycle 1 and a value corresponding to the gravitational acceleration G as illustrated in section B of FIG. 7. For example, the 3-axis G sensor 50 measures that the acceleration Gx is a value obtained by reducing the value corresponding to the gravitational acceleration G from the value corresponding to the acceleration of the motorcycle 1.

As illustrated in FIG. 6C, when the motorcycle 1 is jumping with the front wheel 2 and the rear wheel 3 lifted off from the road surface, since the motorcycle 1 is in a zero-gravity state, the 3-axis G sensor 50 measures that the values of acceleration Gx, acceleration Gy, and acceleration Gz are zero (0), as illustrated in section C in FIG. 7.

As illustrated in FIG. 6D, when the motorcycle 1 lands on the descending slope, at the beginning of landing, the 3-axis G sensor 50 measures, for the acceleration Gz, a value obtained by increasing a value corresponding to the inertial force associated with the landing in the direction of the gravitational acceleration G, and measures, for the acceleration Gx, a value corresponding to the inertial force associated with the landing as illustrated in section D of FIG. 7.

In the traveling state illustrated in FIGS. 6A and 6B and the landing state illustrated in FIG. 6D, the motorcycle 1 travels straight without being inclined in the left-right direction, and lands straight after jumping. Therefore, the 3-axis G sensor 50 measures that the acceleration Gy is 0 in the sections A, B, and D illustrated in FIG. 7.

As described above, when the motorcycle 1 is jumping, in view of the fact that the 3-axis G sensor 50 measures that the values of the acceleration Gx, the acceleration Gy and the acceleration Gz are 0, the determination unit 121 determines whether the vehicle is jumping as described below. That is, the determination unit 121 determines that the motorcycle 1 is jumping when a resultant acceleration Gc ($=\sqrt{(Gx^2+Gy^2+Gz^2)}$) for which the acceleration Gx, the acceleration Gy and the acceleration Gz are combined is less than a predetermined value Gt that is determined in advance. The predetermined value Gt may be exemplified as 2.0 (m/s$^2$) less than the gravitational acceleration G, for example. The determination unit 121 may determine that the vehicle is jumping when the value ($=Gx^2+Gy^2+Gz^2$) obtained by squaring the resultant acceleration Gc is less than the value ($=Gt^2$) obtained by squaring the predetermined value Gt.

The determination unit 121 determines whether the motorcycle 1 is jumping using the acceleration Gx, the acceleration Gy, and the acceleration Gz, thereby providing determination with a higher accuracy than in the case of determining whether the vehicle is jumping using the acceleration Gy in the left-right direction and the acceleration Gz in the vertical direction. Hereinafter, comparison with a comparative configuration that determines that the motorcycle 1 is jumping when the resultant acceleration Gd ($=\sqrt{(Gy^2+Gz^2)}$) for which the acceleration Gy and the acceleration Gz are combined is less than a predetermined value Gt will be described.

Figure 8A:
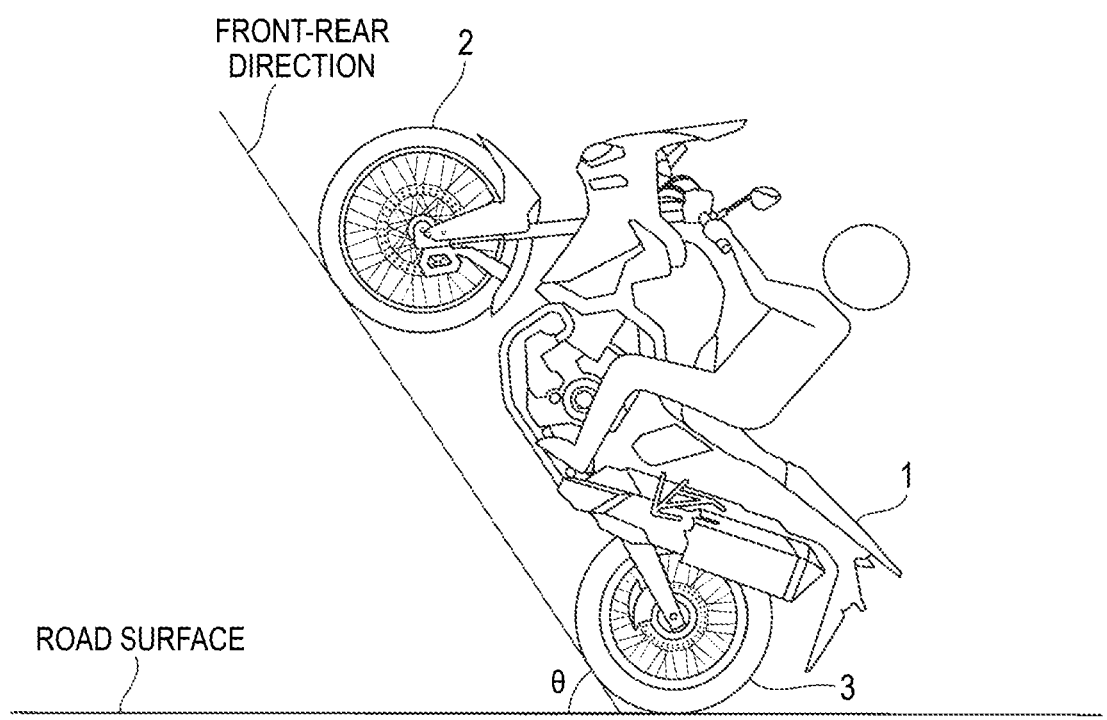
FIG. 8A is a view illustrating a state of performing a wheelie traveling, in which the front wheel travels while being lifted off from a road surface.
Figure 8B:
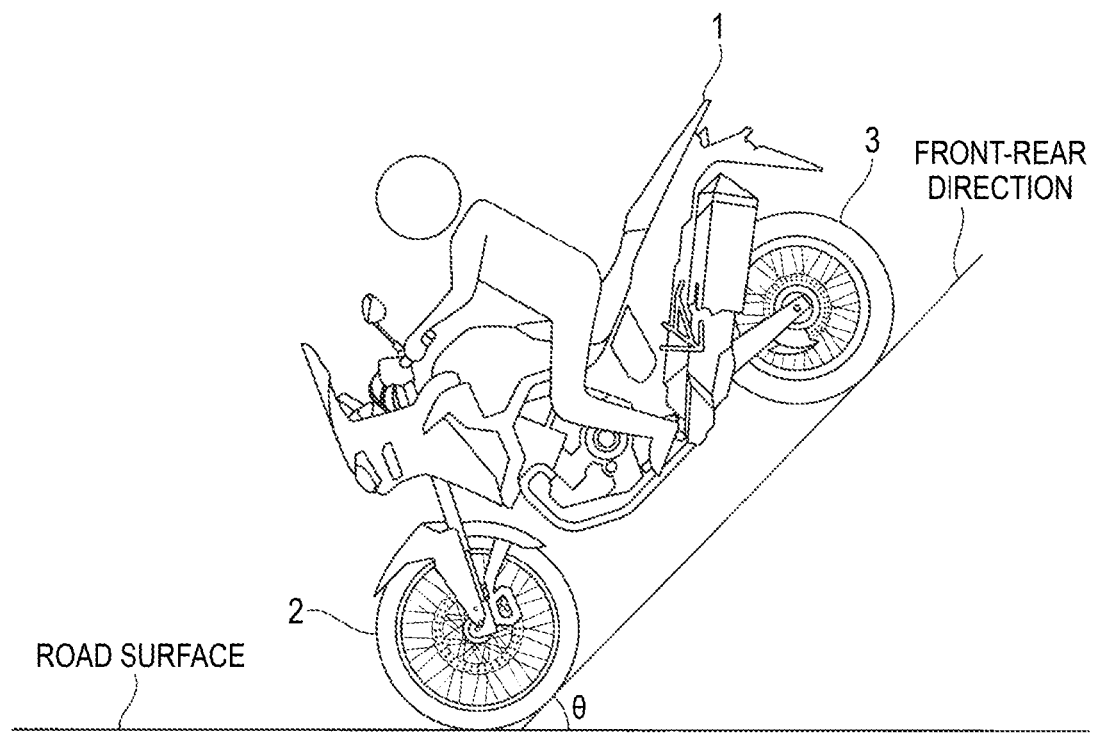
FIG. 8B is a view illustrating a state of jackknifing (rear wheel rising), in which the rear wheel is lifted off from the road surface.

FIG. 8A is a view illustrating a state of performing a wheelie traveling, in which the front wheel 2 is traveling while being lifted off from the road surface. FIG. 8B is a view illustrating a state of jackknifing (rear wheel rising), in which the rear wheel is lifted off from the road surface.

For example, in the wheelie traveling illustrated in FIG. 8A and the jackknifing (rear wheel raising) state illustrated in FIG. 8B, when it is assumed that the angle between the front-rear direction of the motorcycle 1 and the road surface is θ, a Gz sensor that measures an acceleration Gz in the vertical direction of the motorcycle 1 outputs, for acceleration Gz, a value corresponding to (gravitational acceleration G×COS θ). Therefore, the greater the θ is, the less value the Gz sensor outputs for the acceleration Gz. As a result, when the motorcycle 1 is not inclined in the left-right direction, the resultant acceleration Gd ($=\sqrt{(Gy^2+Gz^2)}$) for which the acceleration Gy and the acceleration Gz are combined is equal to the acceleration Gz and may be less than the predetermined value Gt, in some cases. In the comparative configuration, since it is determined that the vehicle is jumping when the resultant acceleration Gd is less than the predetermined value Gt, there is a possibility that it may be erroneously determined that the vehicle is jumping even when it is the wheelie traveling or jackknifing (rear wheel raising) state.

On the other hand, when it is determined whether the motorcycle 1 is jumping using the acceleration Gx, the acceleration Gy and the acceleration Gz measured by the 3-axis G sensor 50, it is possible to suppress the erroneous determination that the vehicle is jumping when the vehicle is not jumping. That is, the 3-axis G sensor 50 outputs a value corresponding to (gravitational acceleration G×SIN θ) for the acceleration Gx in the front-rear direction, and thus, outputs a greater value for the acceleration Gx as the θ is greater. As a result, when the motorcycle 1 is not inclined in the left-right direction, the resultant acceleration Gc ($=\sqrt{(Gx^2+Gy^2+Gz^2)}$) for which the acceleration Gx, the acceleration Gy and the acceleration Gz are combined is equal to the gravitational acceleration G, and is not less than the predetermined value Gt.

It is possible to suppress an erroneous determination that the vehicle is jumping when the motorcycle 1 is falling, for example, by determining by the determination unit 121 using the acceleration Gy in the left-right direction.

As described above, the determination unit 121 can determine whether the motorcycle 1 is jumping with a high accuracy by determining whether the motorcycle 1 is jumping using the acceleration Gx, the acceleration Gy, and the acceleration Gz measured by the 3-axis G sensor 50.

Note that, even when the 3-axis G sensor 50 is attached in an inclined state and cannot measure the acceleration of 3 axes parallel to the front-rear direction, the left-right direction, and the vertical direction, the determination unit 121 can calculate the acceleration Gx, the acceleration Gy, and the acceleration Gz by performing the coordinate conversion. From this point of view, it is possible to determine with a higher accuracy than when determining whether the vehicle is jumping using an output value from a sensor that measures the acceleration in the left-right direction and an output value from a sensor that measures the acceleration in the vertical direction.

The OFF determination unit 123 may determine that the jump flag is set to OFF when a predetermined reference period elapses after a landing from a jump of the motorcycle 1, for example. The reference period may be a period until the end of the vibration of the suspension spring associated with the landing from a jump, for example. In the present example, when the jump flag is ON such as, for example, when the resultant acceleration Gc of the acceleration Gx, the acceleration Gy, and the acceleration Gz measured by the 3-axis G sensor 50 is equal to or greater than the predetermined value Gt, the OFF determination unit 123 may estimate that the motorcycle 1 has landed from a jump. The OFF determination unit 123 may determine whether to set the jump flag to OFF using the acceleration Gx, the acceleration Gy, and the acceleration Gz that are measured by the 3-axis G sensor 50 and extracted by the low pass filter.

Next, the procedure of the target current setting processing performed by the setting unit 120 will be described using a flowchart.

Figure 9:
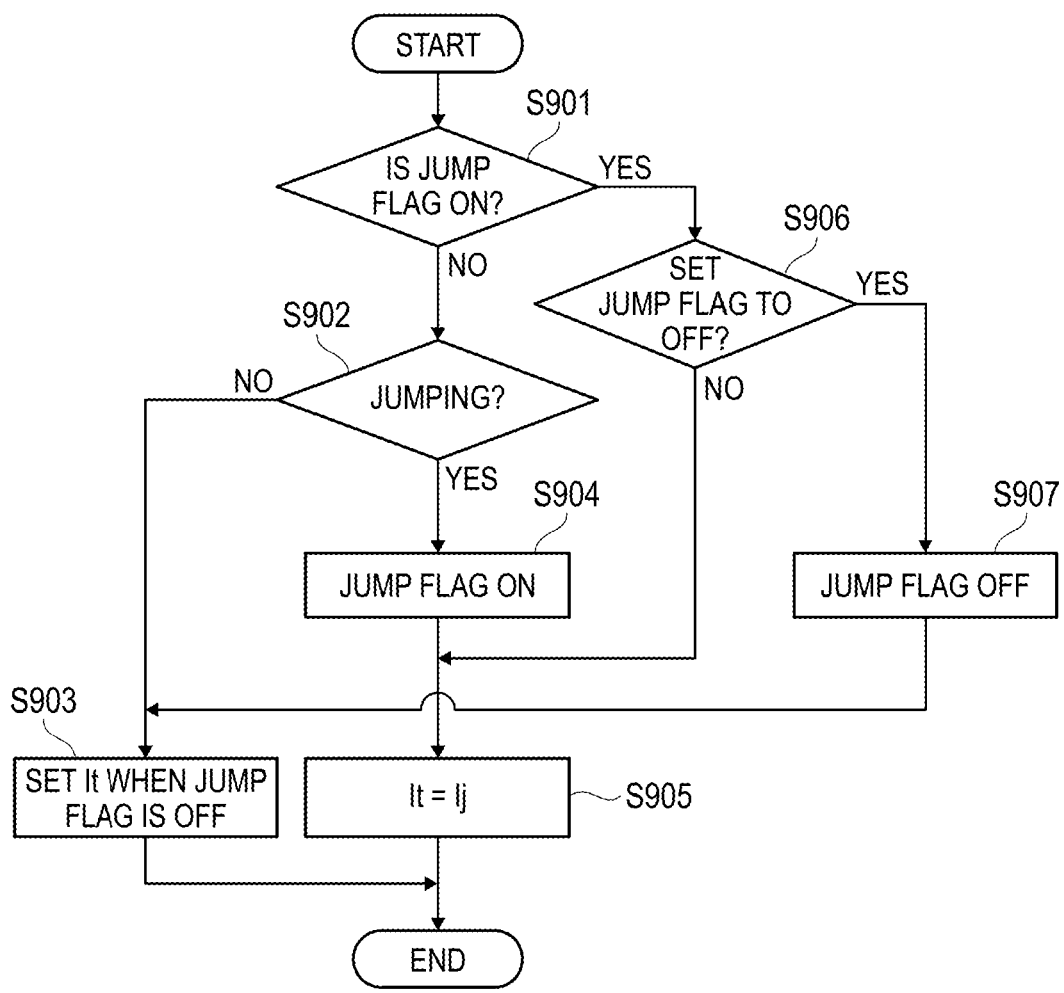
FIG. 9 is a flowchart illustrating a procedure of target current setting processing performed by the setting unit 120.

FIG. 9 is a flowchart illustrating a procedure of the target current setting processing performed by the setting unit 120.

The setting unit 120 repeatedly executes the target current setting processing every predetermined period (for example, 1 millisecond).

The setting unit 120 determines whether the jump flag is ON (step 901 (hereinafter, the step may be referred to as "S", in some cases)). It is a processing at the determination unit 121 and the OFF determination unit 123 of checking and determining whether the jump flag is ON. When the jump flag is OFF (No in S901), the setting unit 120 determines whether the vehicle is jumping (S902). It is a processing at the determination unit 121 of determining whether the resultant acceleration Gc for which the acceleration Gx, the acceleration Gy, and the acceleration Gz measured by the 3-axis G sensor 50 are combined is less than the predetermined value Gt, and when the resultant acceleration Gc is less than the predetermined value Gt, determining that the vehicle is jumping. When the vehicle is not jumping (No in S902), the setting unit 120 sets the target current It of when the jump flag is OFF (S903). It is a processing at the OFF time setting unit 127 of setting the target current It of when the selection unit 128 selects OFF. The OFF time setting unit 127 acquires the stroke speed Vp calculated by the calculation unit 110, and sets, as the target current It, a value calculated based on the acquired stroke speed Vp and the control map illustrated in FIG. 5, for example.

On the other hand, when the vehicle is jumping (Yes in S902), the setting unit 120 sets the jump flag to ON (S904). It is a processing at the flag ON unit 122 of setting the jump flag to ON. Thereafter, the setting unit 120 sets the ON time current Ij described above as the target current It (S905). It is a processing at the ON time setting unit 126 of setting the ON time current Ij as the target current It when the selection unit 128 selects ON.

On the other hand, when the jump flag is ON (Yes in S901), it is determined whether to set the jump flag to OFF (S906). It is a processing at the OFF determination unit 123 of determining whether to set the jump flag to OFF. When it is determined to set the jump flag to OFF (Yes in S906), the setting unit 120 sets the jump flag to OFF (S907). It is a processing at the flag OFF unit 124 of setting the jump flag to OFF. Then, the setting unit 120 sets the target current It of when the jump flag is OFF (S903). On the other hand, when it is not determined to set the jump flag to OFF (No in S906), the setting unit 120 sets the ON time current Ij as the target current It (S905).

The setting unit 120 performs the target current setting processing to set the target current It, and so the control device 100 controls the damping force of the damping device 200 as follows.

The control device 100 controls the damping force of damping device 200 that damps the force generated between the vehicle body 10 and the wheel of motorcycle 1. The control is characterized by determining whether the motorcycle 1 is jumping using the acceleration Gx in the front-rear direction of the motorcycle 1, the acceleration Gy thereof in the left-right direction, and the acceleration Gz thereof in the vertical direction and when it is determined that the vehicle is jumping, increasing the damping force of the damping device 200 to be greater than the damping force generated when it is not determined that the vehicle is jumping.

That is, at step 902 illustrated in FIG. 9, the control device 100 determines whether the vehicle is jumping using the acceleration Gx, the acceleration Gy and the acceleration Gz measured by the 3-axis G sensor 50. Then, when it is determined that the vehicle is jumping, the control device 100 set the ON time current Ij as the target current It, in the step 905 illustrated in FIG. 9. On the other hand, when it is determined that the vehicle is not jumping, the control device 100 sets the target current It of normal traveling, in step 903 illustrated in FIG. 9. In the present example, the ON time current Ij is a current greater than the current supplied during normal traveling. Therefore, when it is determined that the vehicle is jumping, the control device 100 increases the damping force of the damping device 200 to be greater than the damping force generated when it is not determined that the vehicle is jumping.

Then, by controlling the damping force of the damping device 200 as such, the control device 100 may accurately determine that the vehicle is jumping, and may prepare in advance so that the damping force of the damping device 200 is increased at the time of landing from a jump. Therefore, according to the control by the control device 100, it is possible to suppress the contraction of the damping device 200 (which is in the most contracted state) associated with the landing from a jump, and it is possible to suppress the adverse influence on the subsequent steering. According to the control by the control device 100, the damping force of the damping device 200 is increased when it is determined that the vehicle is jumping, so the damping force of when it is not determined that the vehicle is jumping is less than the damping force of when it is determined that the vehicle is jumping. Therefore, according to the control device 100, it is possible to control the damping force of the damping device 200 so as not to deteriorate the ride comfort when it is not determined that the vehicle is jumping, such as during normal traveling, for example.

In the present example, when the resultant acceleration Gc for which the acceleration (acceleration Gx) in the front-rear direction, the acceleration (acceleration Gy) in the left-right direction and the acceleration (acceleration Gz) in the vertical direction are combined is less than the predetermined value Gt which is determined in advance, the control device 100 may determine that the vehicle is jumping. That is, the control device 100 determines whether the resultant acceleration Gc for which the acceleration Gx, the acceleration Gy and the acceleration Gz measured by the 3-axis G sensor 50 in step 902 illustrated in FIG. 9 are combined is less than the predetermined value Gt, and when the resultant acceleration Gc is less than the predetermined value Gt, determines that the vehicle is jumping. As such, according to the control device 100, it is possible to determine whether the vehicle is jumping with high accuracy.

At the time of jumping when it is determined that the vehicle is jumping, the control device 100 may increase the damping force in the compression direction such that the relative displacement between the vehicle body 10 and the wheel is less than that at the time of normal traveling when it is not determined that the vehicle is jumping. That is, when determining that the vehicle is jumping, the control device 100 sets the ON time current Ij as the target current It regardless of the stroke speed Vp, in step 905 illustrated in FIG. 9. As a result, at the time of landing from a jump, the damping force is increased during the compression stroke when the entire length of the damping device 200 is reduced. As a result, according to the control device 100, it is possible to suppress the contraction of the damping device 200 (the most contracted state) associated with the landing from a jump, and it is possible to suppress the adverse influence on the subsequent steering.

Until a predetermined reference period elapses after the landing from a jump, the control device 100 may increase not only the damping force in the compression direction, but also the damping force in the extension direction that causes the relative displacement between the vehicle body 10 and the wheel to be increased, compared to those during normal traveling. As a result, the damping force is increased in the extension stroke in which the entire length of the damping device 200 extends after the compression stroke of the damping device 200 at the time of landing from a jump. As a result, according to the control device 100, it is possible to deal with the vibration of the suspension spring associated with the landing from a jump at an early stage, and thus improve the steering performance after landing.

The control device 100 may stop increasing the damping force of the damping device 200 when the predetermined reference period elapses after the landing from a jump of the vehicle. In other words, the control device 100 may increase the damping force of the damping device 200 until the reference period elapses after the landing from a jump of the vehicle. For example, by setting the reference period to a period until the end of the vibration of the suspension spring associated with the jump, the damping force may be increased in the compression stroke of the damping device 200 at the time of landing from a jump and in the extension stroke after the compression stroke when the entire length of the damping device 200 is extended. As a result, according to the control device 100, it is possible to deal with the vibration of the suspension spring associated with the landing from a jump at an early stage, and thus improve the steering performance after landing.

As described above, the suspension device 20 includes the damping device 200 that damps the force generated between the vehicle body 10 and the wheel of the motorcycle 1 as an example of the vehicle. The suspension device 20 includes the determination unit 121 which determines whether the motorcycle 1 is jumping, using the acceleration Gx in the front-rear direction of the motorcycle 1, the acceleration Gy thereof in the left-right direction, and the acceleration Gz thereof in the vertical direction It. The suspension device 20 includes, as an example of the damping force control unit, the ON time setting unit 126 that increases the damping force of the damping device 200 to be greater than the damping force generated when the determination unit 121 does not determine that the vehicle is jumping by setting the ON time current Ij as the target current It when the determination unit 121 determines that the vehicle is jumping.

In the suspension device 20 configured as described above, the determination unit 121 determines whether the motorcycle 1 is jumping, using the acceleration Gx, the acceleration Gy, and the acceleration Gz. Therefore, for example, it is possible to determine whether the vehicle is jumping with higher accuracy as compared to when determining it using the acceleration Gy and the acceleration Gz. When the determination unit 121 determines that the vehicle is jumping, the damping force of the damping device 200 is increased by using the ON time setting unit 126 to be greater than the damping force generated when it is not determined that the vehicle is jumping, thereby suppressing the contraction of the damping device 200 associated with the landing from a jump. Therefore, the suspension device 20 can improve the steering performance at the time of landing from a jump with high accuracy. On the other hand, according to the suspension device 20, when it is not determined that the vehicle is jumping, the damping force is decreased to be less than that when it is determined that the vehicle is jumping, and it is thus possible to prevent from deteriorating the ride comfort during normal traveling.

The determination unit 121 determines that the vehicle is jumping when the resultant acceleration Gc for which the acceleration Gx in the front-rear direction, the acceleration Gy in the left-right direction, and the acceleration Gz in the vertical direction are combined is less than a predetermined value Gt which is determined in advance. As a result, the suspension device 20 may determine whether the vehicle is jumping with a higher accuracy as compared to when determining that the vehicle is jumping when the resultant acceleration Gd $(=\sqrt{(Gy^2+Gz^2)})$ for which the acceleration Gy and the acceleration Gz are combined is less than the predetermined value Gt, for example.

Note that, when the jump flag is ON, for increasing the damping force of the damping device 200 from that when the jump flag is OFF, the setting unit 120 may set the damping force of the damping device 21d on the front wheel side greater than the damping force of the damping device 22d on the rear wheel side. That is, the ON time setting unit 126 of the setting unit 120 may set the ON time current Ij which is set when the jump flag is ON, such that the damping force of the damping device 21d on the front wheel side is greater than the damping force of the damping device 22d on the rear wheel side. When landing from a jump, since it is necessary to absorb a large amount of energy on both the front wheel side and the rear wheel side, it is effective to increase the damping force of the damping device 200 on both the front wheel side and the rear wheel side greater than the damping force generated during normal traveling when it is not determined that the vehicle is jumping. Then, at the time of landing, it is considered that landing from the front wheel 2 is more likely in many cases, and accordingly, by having the damping force of the damping device 21d on the front wheel side greater than the damping force of the damping device 22d on the rear wheel side, it is possible to suppress the deterioration of the ride comfort while absorbing a large amount of energy.

The processing performed by the control device 100 described above may be implemented by cooperation of software and hardware resources. Here, a CPU in the control computer provided in the control device 100 executes a program for implementing each function of the control device 100 to implement each of these functions. For example, a non-transitory computer readable recording medium recording a program is provided to the control device 100, and the CPU in the control device 100 reads the program stored in the recording medium. Here, the program itself read from the recording medium implements the functions of the embodiment described above, and the program itself and the recording medium recording the same are included in the present invention. The recording media for supplying such programs may be exemplified as flexible disks, CD-ROMs, DVD-ROMs, hard disks, optical disks, magneto-optical disks, CD-Rs, magnetic tapes, non-volatile memory cards, and ROMs.

Figure 10:
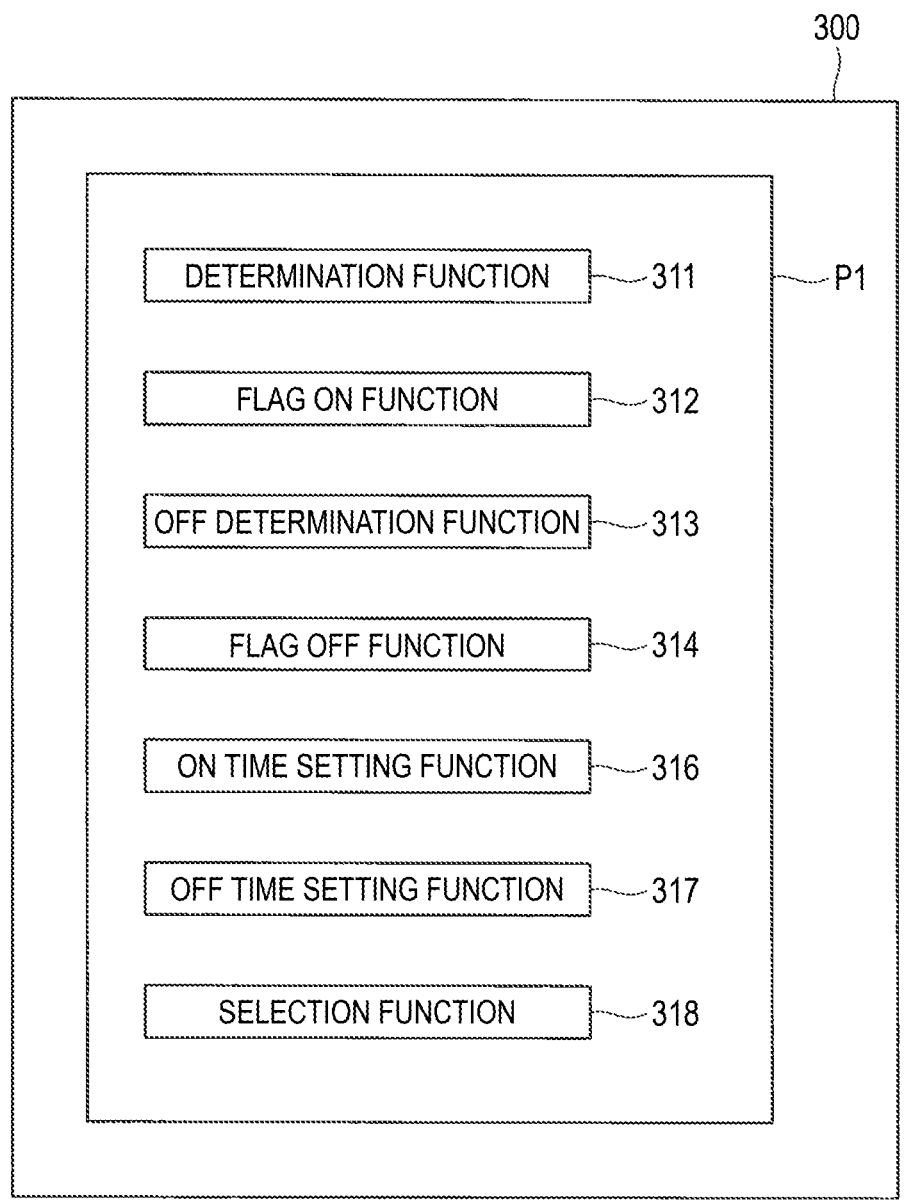
FIG. 10 is a view illustrating a schematic configuration of a recording medium 300 according to the first embodiment.

FIG. 10 is a view illustrating a schematic configuration of a recording medium 300 according to the first embodiment. The recording medium 300 is a non-transitory computer readable recording medium which records a program P1 that causes a computer to implement the function of controlling the damping force of the damping device 200.

As illustrated in FIG. 10, the recording medium 300 according to the present embodiment stores the program P1.

The program P1 has a determination function 311 for determining whether the motorcycle 1 is jumping, and a flag ON function 312 which sets the jump flag to ON in a predetermined recording area when the determination function 311 determines that the vehicle is jumping.

The program P1 has an OFF determination function 313 of determining whether to set the jump flag to OFF when the jump flag is ON, and a flag OFF function 314 of setting the jump flag to OFF when the OFF determination function 313 determines to set the jump flag to OFF.

The program P1 has an ON time setting function 316 of setting the target current It to be supplied to the solenoid of the damping force control valve 240 when the jump flag is ON.

The program P1 has an OFF time setting function 317 of setting the target current It to be supplied to the solenoid of the damping force control valve 240 when the jump flag is OFF.

The program P1 has a selection function 318 of selecting any one of the ON time setting function 316 and the OFF time setting function 317 of setting the target current It.

The determination function 311 is a module that implements the function of the determination unit 121 illustrated in FIG. 4.

The flag ON function 312 is a module that implements the function of the flag ON unit 122 illustrated in FIG. 4.

The OFF determination function 313 is a module that implements the function of the OFF determination unit 123 illustrated in FIG. 4.

The flag OFF function 314 is a module that implements the function of the flag OFF unit 124 illustrated in FIG. 4.

The ON time setting function 316 is a module that implements the function of the ON time setting unit 126 illustrated in FIG. 4.

The OFF time setting function 317 is a module that implements the function of the OFF time setting unit 127 illustrated in FIG. 4.

The selection function 318 is a module that implements the function of the selection unit 128 illustrated in FIG. 4.

As described above, the recording medium 300 is a non-transitory computer readable recording medium which records the program P1 that causes a computer to implement the function of controlling the damping force of the damping device 200. The recorded program P1 causes the computer to implement the function of determining whether the motorcycle 1 is jumping, using the acceleration Gx in the front-rear direction of the motorcycle 1, the acceleration Gy thereof in the left-right direction, and the acceleration Gz thereof in the vertical direction as an example of a vehicle. When it is determined that the vehicle is jumping, the recorded program P1 causes the computer to implement the function of increasing the damping force of the damping device 200 to damp the force generated between the vehicle body 10 and the wheel of the motorcycle 1 to be greater than the damping force generated when it is not determined that the vehicle is jumping.

After the program read from the recording medium 300 is written in the memory in the control computer provided in the control device 100, the CPU or the like may perform part or all of the actual processing based on the instructions from the program, and the functions of the embodiment described above may be implemented by the processing. The software program for implementing the functions according to the embodiment is distributed through a network to be stored in a recording unit such as a hard disk or a ROM of the control device 100 or a recording medium such as a CD-RW or a CD-R. Then, the CPU of the control device 100 may read out and execute the program stored in the recording unit or the recording medium at the time of use.

Second Embodiment

Figure 11:
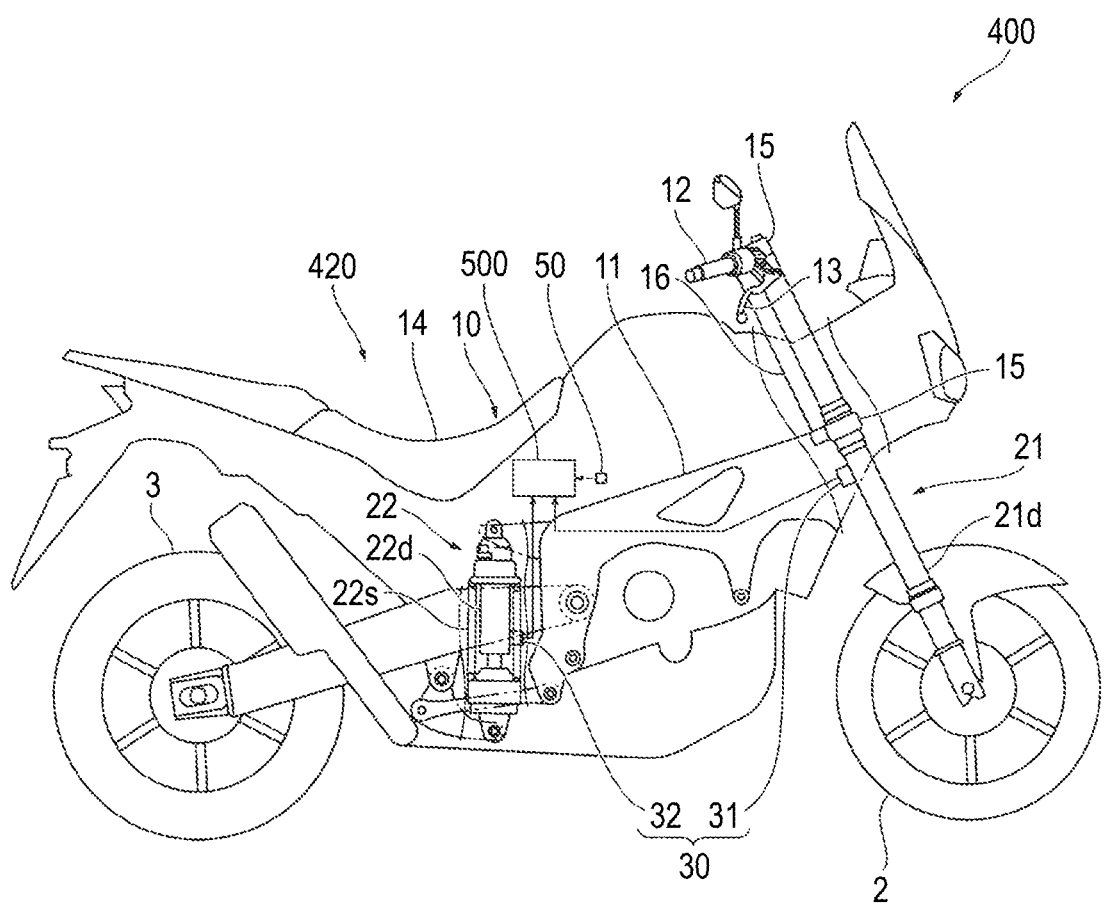
FIG. 11 is a view illustrating a schematic configuration of a motorcycle 400 according to a second embodiment.

FIG. 11 is a view illustrating a schematic configuration of a motorcycle 400 according to a second embodiment.

Figure 12:
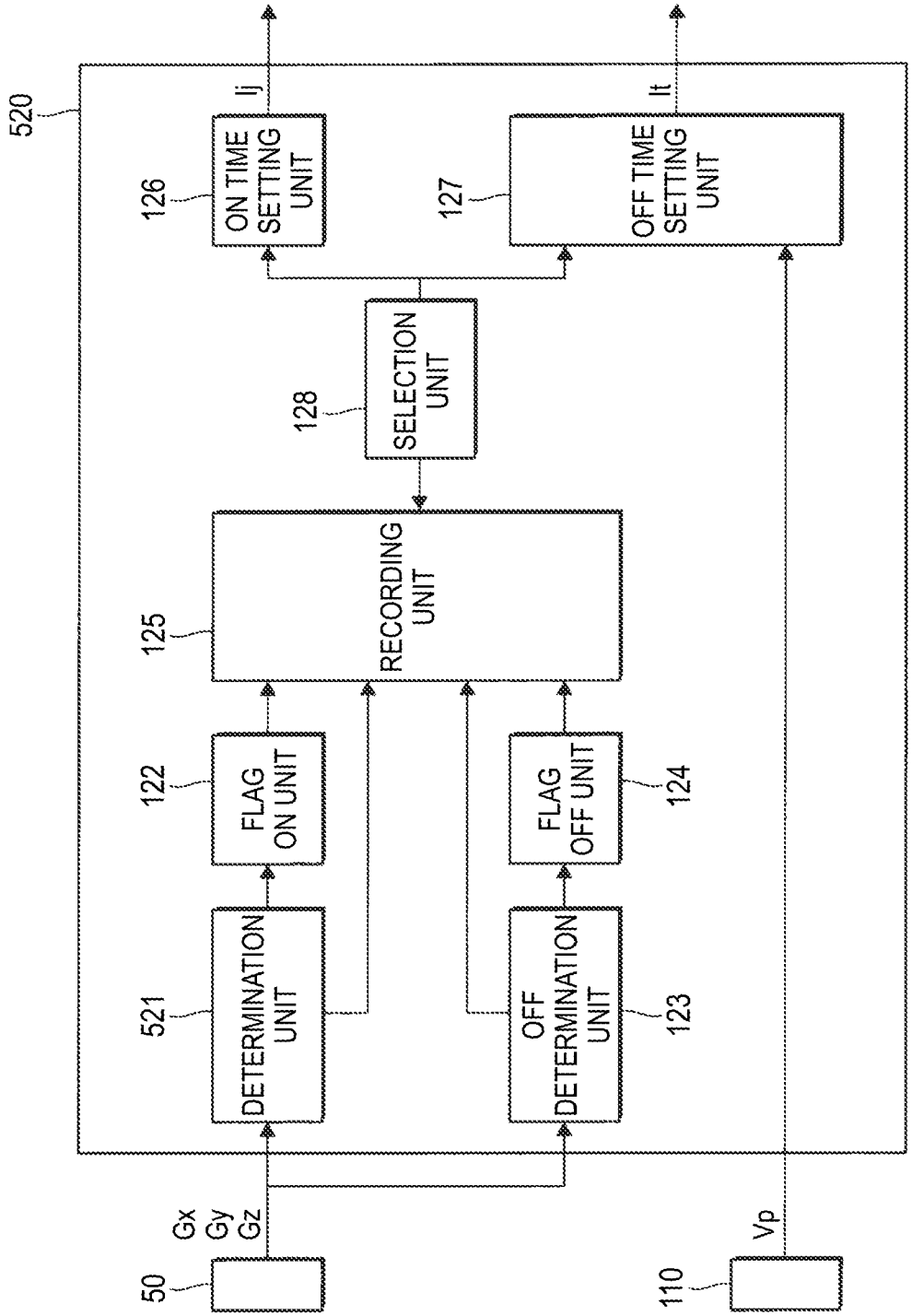
FIG. 12 is a diagram illustrating a schematic configuration of a setting unit 520 according to the second embodiment.

FIG. 12 is a diagram illustrating a schematic configuration of the setting unit 520 according to the second embodiment.

The motorcycle 400 according to the second embodiment is different from the motorcycle 1 according to the first embodiment in view of a configuration corresponding to the determination unit 121. Hereinafter, differences from the motorcycle 1 will be described. Between the motorcycle 1 and the motorcycle 400, components having the same shapes and functions are denoted by the same reference numerals, and a detailed description thereof will be omitted.

As illustrated in FIG. 11, the motorcycle 400 according to the second embodiment includes a control device 500 that controls the damping force of the damping devices 21d and 22d. A suspension device 420 according to the present invention is a device having suspensions (the suspension 21 and the suspension 22) and a control device 500.

The control device 500 is configured in the same manner as the control device 100 except that a setting unit 520 is provided instead of the setting unit 120 of the control device 100 according to the first embodiment.

As illustrated in FIG. 12, the setting unit 520 includes a determination unit 521 that determines whether the motorcycle 400 is jumping, and a flag ON unit 122 that sets a jump flag to ON, which is a flag indicating that the vehicle is jumping when the determination unit 521 determines that the vehicle is jumping.

The setting unit 520 includes an OFF determination unit 123, a flag OFF unit 124, a recording unit 125, an ON time setting unit 126, an OFF time setting unit 127, and a selection unit 128.

When a period of the resultant acceleration Gc being less than a predetermined value Gt continues for a predetermined period, in which the resultant acceleration Gc is obtained by combining the acceleration Gx, the acceleration Gy and the acceleration Gz, which are measured by the 3-axis G sensor 50, the determination unit 521 determines that the motorcycle 400 is jumping (the case when the above period exceeds the predetermined period will be described below). When the period of a square value of the resultant acceleration Gc ($=Gx^2+Gy^2+Gz^2$) being less than a square value ($=Gt^2$) of the predetermined value Gt continues for a predetermined period, the determination unit 521 may determine that the motorcycle 400 is jumping.

Next, the procedure of the target current setting processing performed by the setting unit 520 will be described using a flowchart.

Figure 13:
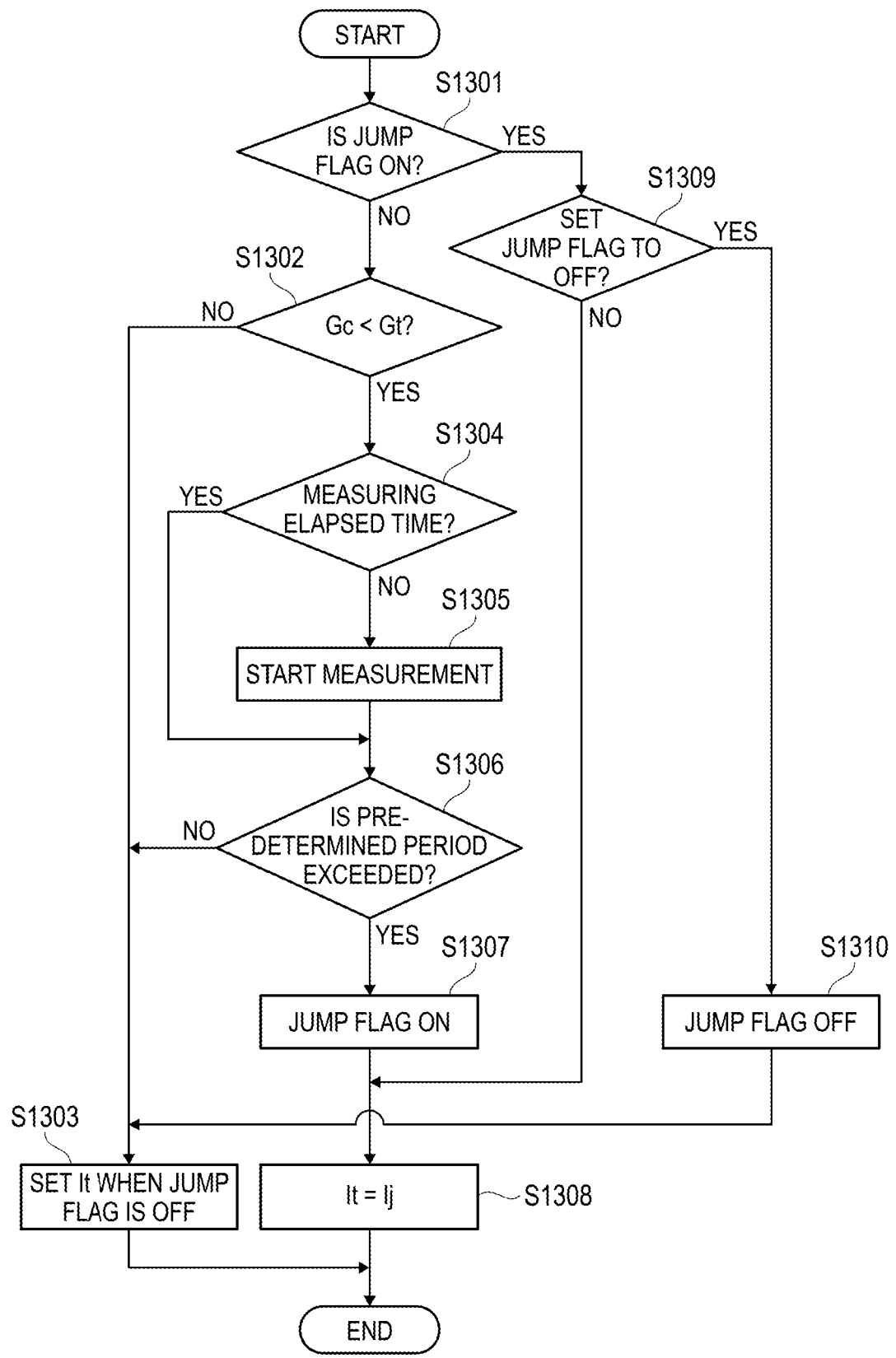
FIG. 13 is a flowchart illustrating a procedure of target current setting processing performed by the setting unit 520.

FIG. 13 is a flowchart illustrating the procedure of the target current setting processing performed by the setting unit 520.

The setting unit 520 repeatedly executes the target current setting processing every predetermined period (for example, 1 millisecond).

The setting unit 520 determines whether the jump flag is ON (S1301). It is a processing at the determination unit 521 and the OFF determination unit 123 of checking and determining whether the jump flag is ON. When the jump flag is OFF (No in S1301), the setting unit 520 determines whether the resultant acceleration Gc for which the acceleration Gx, the acceleration Gy, and the acceleration Gz measured by the 3-axis G sensor 50 are combined is less than a predetermined value Gt (S1302). It is a processing at the determination unit 521 of calculating the resultant acceleration Gc for which the acceleration Gx, the acceleration Gy, and the acceleration Gz measured by the 3-axis G sensor 50 are combined, and determining whether the calculated resultant acceleration Gc is less than the predetermined value Gt. When the resultant acceleration Gc is not less than the predetermined value Gt (No in S1302), the setting unit 520 sets the target current It of when the jump flag is OFF (S1303). It is a processing at the OFF time setting unit 127 of setting the target current It of normal traveling.

Meanwhile, when the resultant acceleration Gc is less than the predetermined value Gt (Yes in S1302), the setting unit 520 determines whether the elapsed time of the resultant acceleration Gc being less than the predetermined value Gt is measured (S1304). When the elapsed time is not measured (No in S1304), measurement of the elapsed time is started (S1305). Thereafter, the setting unit 520 determines whether the elapsed time of the resultant acceleration Gc being less than the predetermined value Gt exceeds a predetermined period (S1306). When the elapsed time is measured (Yes in S1304), the setting unit 520 determines whether the elapsed time exceeds a predetermined period (S1306). When the elapsed time does not exceed the predetermined period (No in S1306), the setting unit 520 sets the target current It of when the jump flag is OFF (S1303). Meanwhile, when the elapsed time exceeds the predetermined period (Yes in S1306), the setting unit 120 sets the jump flag to ON (S1307). It is a processing at the flag ON unit 122 of setting the jump flag to ON. Thereafter, the setting unit 520 sets a predetermined ON time current Ij as the target current It (S1308). The processing at S1302, S1304, S1305, and S1306 are the processing performed by the determination unit 521. That is, when the period of the resultant acceleration Gc being less than the predetermined value Gt continues for a predetermined period (Yes in S1306), the determination unit 521 determines that the motorcycle 400 is jumping.

On the other hand, when the jump flag is ON (Yes in S1301), it is determined whether to set the jump flag to OFF (S1309). It is a processing at the OFF determination unit 123 of determining whether to set the jump flag to OFF. When it is determined to set the jump flag to OFF (Yes in S1309), the setting unit 520 sets the jump flag to OFF (S1310). It is a processing at the flag OFF unit 124 of setting the jump flag to OFF. When the condition for setting the jump flag to OFF is not satisfied (No in S1309), the setting unit 520 sets the ON time current Ij as the target current It (S1308).

As described above, when a period of the resultant acceleration Gc being equal to or less than a predetermined value Gt that is determined in advance continues for a predetermined period, in which the resultant acceleration Gc is obtained by combining the acceleration in the front-rear direction (acceleration Gx), the acceleration in the left-right direction (acceleration Gy) and the acceleration in the vertical direction (acceleration Gz), the control device 500 may determine that the vehicle is jumping. That is, in step 1302 illustrated in FIG. 13, the control device 500 determines whether the resultant acceleration Gc for which the acceleration Gx, the acceleration Gy and the acceleration Gz measured by the 3-axis G sensor 50 are combined is less than the predetermined value Gt. Then, in step 1306, the control device 500 determines whether an elapsed time of the resultant acceleration Gc being less than predetermined value Gt exceeds a predetermined period, and when the elapsed time exceeds the predetermined period, the control device 500 determines that the vehicle is jumping. As a result, according to the control device 500, it is possible to determine whether the vehicle is jumping with high accuracy.

Figure 14:
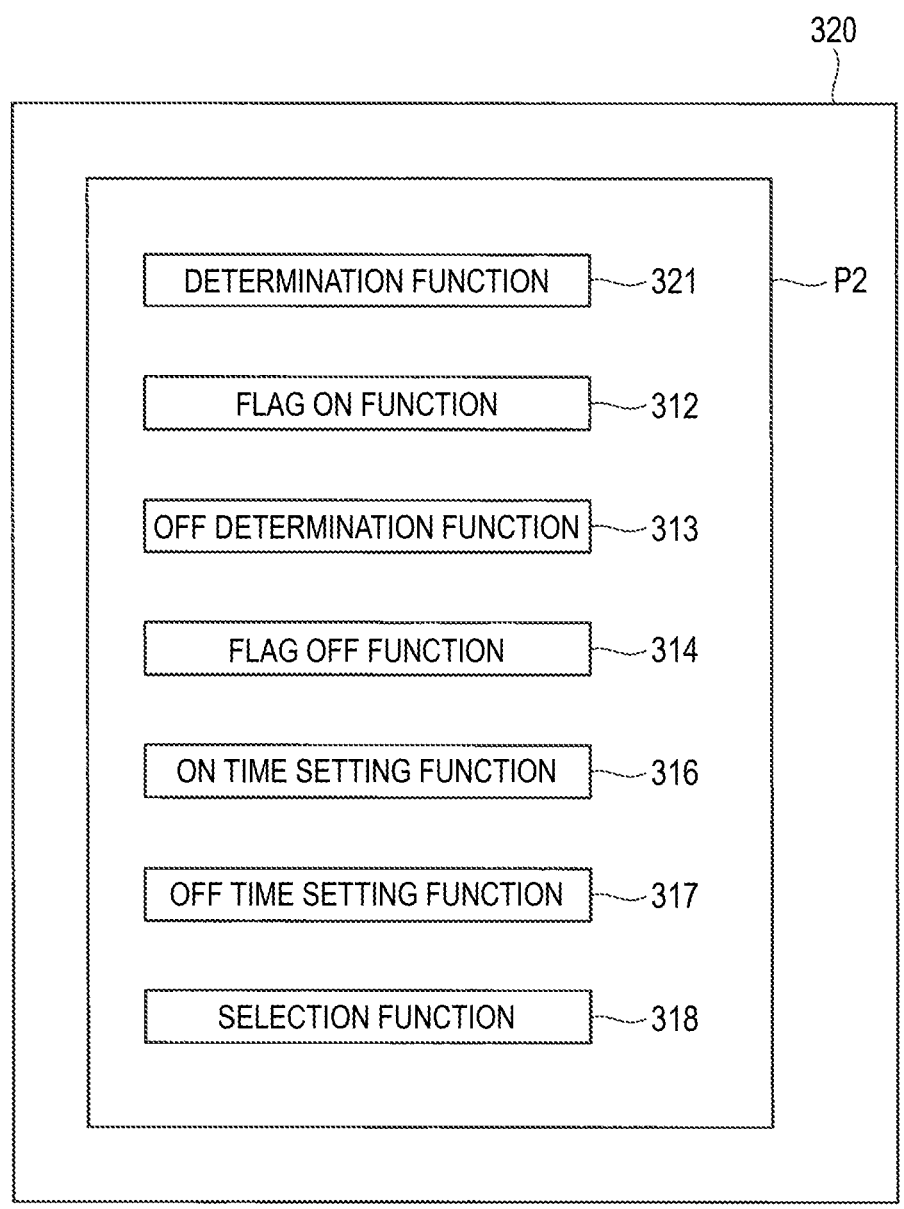
FIG. 14 is a view illustrating a schematic configuration of a recording medium 320 according to the second embodiment.

FIG. 14 is a view illustrating a schematic configuration of a recording medium 320 according to the second embodiment. The recording medium 320 is a non-transitory computer readable recording medium which records a program P2 that causes a computer to implement the function of controlling the damping force of the damping device 200.

As illustrated in FIG. 14, the recording medium 320 according to the present embodiment stores a program P2.

The program P2 has a determination function 321 of determining whether the motorcycle 400 is jumping, and a flag ON function 312 of setting the jump flag to ON in a predetermined recording area when the determination function 321 determines that the vehicle is jumping The program P2 has an OFF determination function 313, a flag OFF function 314, an ON time setting function 316, an OFF time setting function 317, and a selection function 318.

The determination function 321 is a module that implements the function of the determination unit 521 illustrated in FIG. 12.

As described above, the recording medium 320 is a non-transitory computer readable recording medium which records the program P2 that causes a computer to implement the function of controlling the damping force of the damping device 200. The recorded program P2 causes the computer to implement the function of determining that the vehicle is jumping when a period of the resultant acceleration Gc for which the acceleration Gx in the front-rear direction, the acceleration Gy in the left-right direction, and the acceleration Gz in the vertical direction are combined being less than the predetermined value Gt continues for a predetermined period.

Third Embodiment

Figure 15:
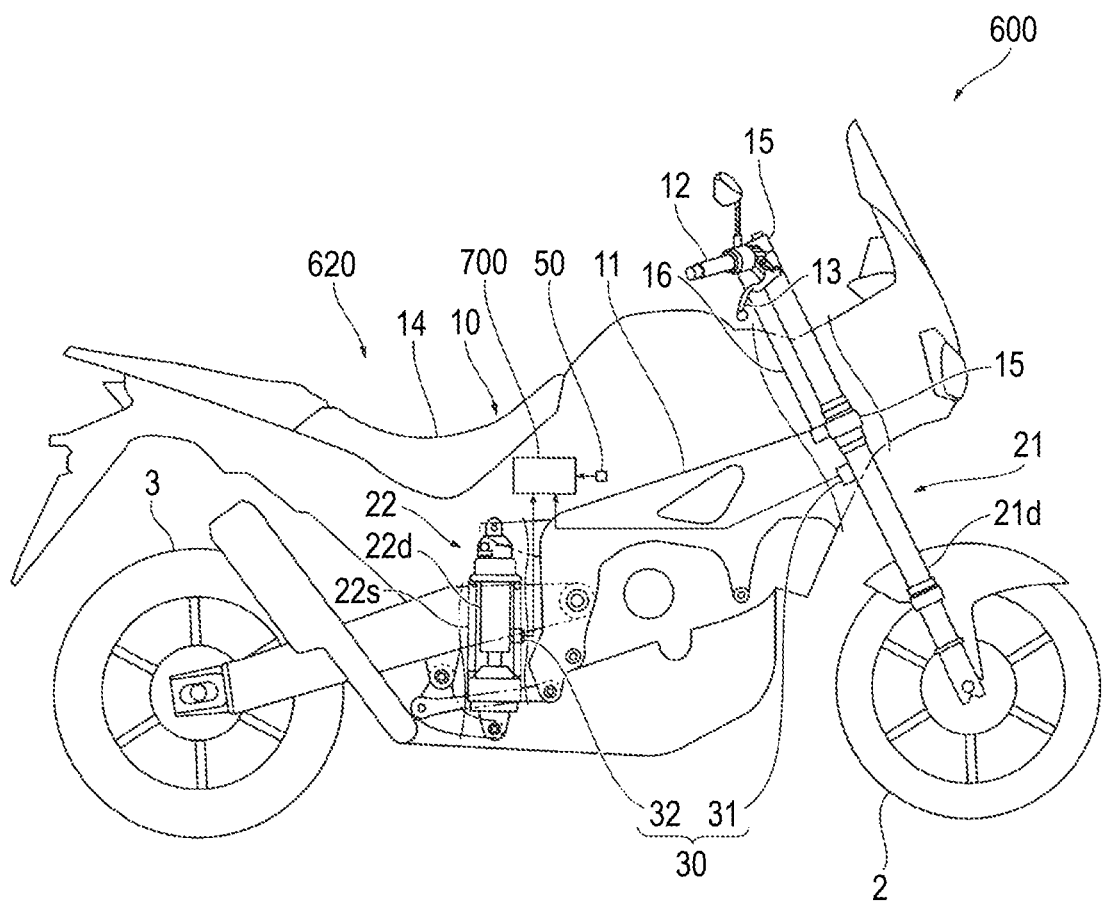
FIG. 15 is a view illustrating a schematic configuration of a motorcycle 600 according to a third embodiment.

FIG. 15 is a view illustrating a schematic configuration of a motorcycle 600 according to a third embodiment.

Figure 16:
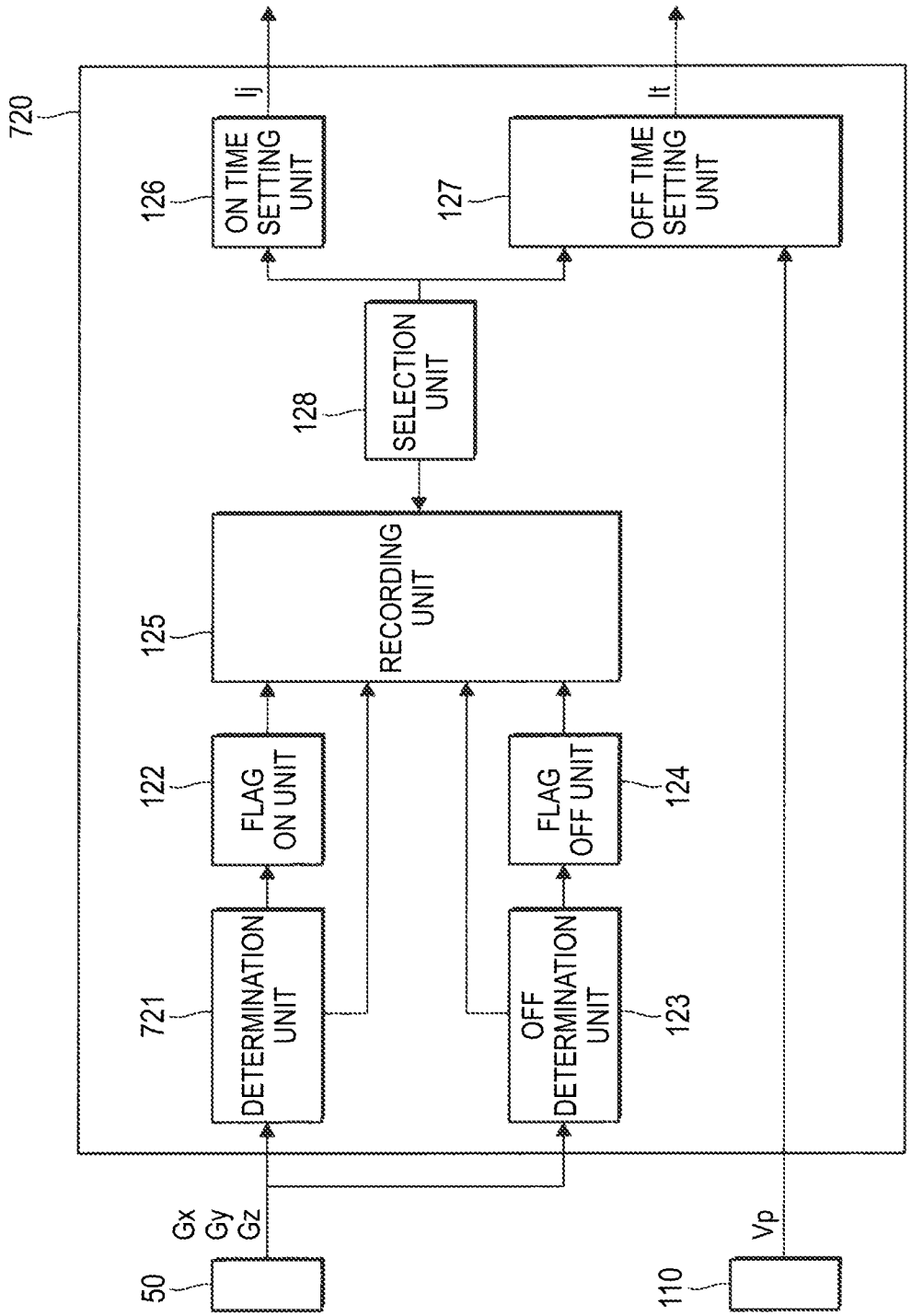
FIG. 16 is a diagram illustrating a schematic configuration of a setting unit 720 according to the third embodiment.

FIG. 16 is a diagram illustrating a schematic configuration of the setting unit 720 according to the third embodiment.

The motorcycle 600 according to the third embodiment is different from the motorcycle 1 according to the first embodiment in view of a configuration corresponding to the determination unit 121. Hereinafter, differences from the motorcycle 1 will be described. Between the motorcycle 1 and the motorcycle 600, components having the same shapes and functions are denoted by the same reference numerals, and a detailed description thereof will be omitted.

As illustrated in FIG. 15, the motorcycle 600 according to the third embodiment includes a control device 700 that controls the damping force of the damping devices 21d and 22d. A suspension device 620 according to the present invention is a device having suspensions (the suspension 21 and the suspension 22) and a control device 700.

The control device 700 is configured in the same manner as the control device 100 except that a setting unit 520 is provided instead of the setting unit 120 of the control device 100 according to the first embodiment.

As illustrated in FIG. 16, the setting unit 720 includes a determination unit 721 that determines whether the motorcycle 600 is jumping, and a flag ON unit 122 that sets a jump flag to ON, which is a flag indicating that the vehicle is jumping when the determination unit 721 determines that the vehicle is jumping.

The setting unit 720 includes an OFF determination unit 123, a flag OFF unit 124, a recording unit 125, an ON time setting unit 126, an OFF time setting unit 127, and a selection unit 128.

When the motorcycle 600 is jumping, the determining unit 721 determines whether the vehicle is jumping considering the increase in the length of the suspension. The determination unit 721 determines that the vehicle is jumping when the resultant acceleration Gc for which the acceleration Gx, the acceleration Gy and the acceleration Gz measured by the 3-axis G sensor 50 are combined is less than a predetermined value Gt and the length of the suspension measured by the stroke sensor 30 is longer than a predetermined length. That is, when the resultant acceleration Gc is less than the predetermined value Gt, and the length Lf of the suspension 21 is longer than the predetermined length Lf1 on the front wheel side and the length Lr of the suspension 22 is longer than the predetermined length Lr1 on the rear wheel side, the determination unit 721 determines that the vehicle is jumping. The determination unit 721 may determine that the vehicle is jumping when a square value ($=Gx^2+Gy^2+Gz^2$) of the resultant acceleration Gc is less than a square value ($=Gt^2$) of the predetermined value Gt, and the length of the suspension is longer than a predetermined length.

Next, the procedure of the target current setting processing performed by the setting unit 720 will be described using a flowchart.

Figure 17:
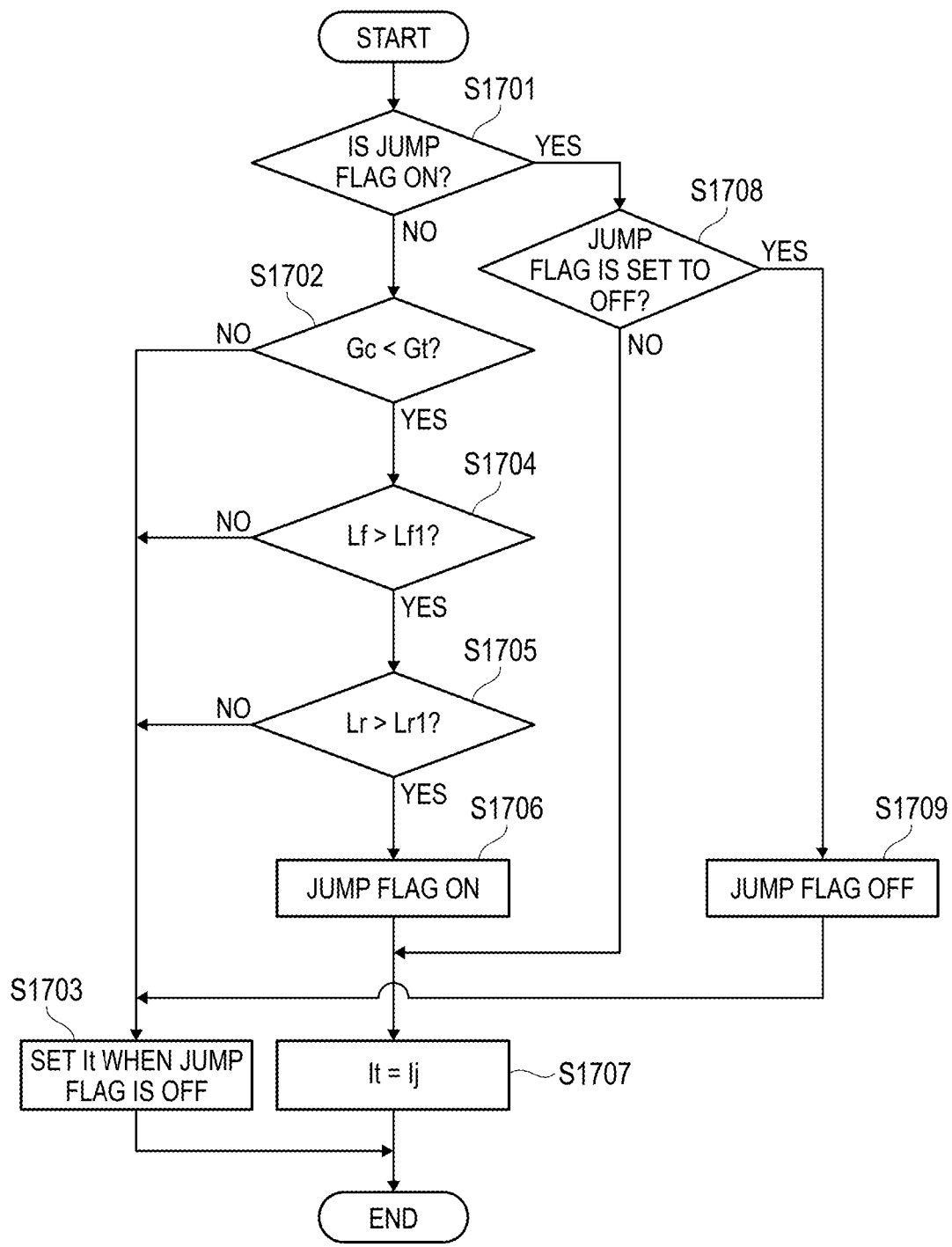
FIG. 17 is a flowchart illustrating a procedure of target current setting processing performed by the setting unit 720.

FIG. 17 is a flowchart illustrating the procedure of the target current setting processing performed by the setting unit 720.

The setting unit 720 repeatedly executes the target current setting processing every predetermined period (for example, 1 millisecond).

The setting unit 720 determines whether the jump flag is ON (S1701). It is a process of determination by the determination unit 721 by checking whether the jump flag is ON. When the jump flag is OFF (No in S1701), the setting unit 720 determines whether the resultant acceleration Gc for which the acceleration Gx, the acceleration Gy and the acceleration Gz measured by the 3-axis G sensor 50 are combined is less than the predetermined value Gt (S1702). It is a processing at the determination unit 721 of calculating the resultant acceleration Gc for which the acceleration Gx, the acceleration Gy, and the acceleration Gz measured by the 3-axis G sensor 50 are combined, and determining whether the calculated resultant acceleration Gc is less than the predetermined value Gt. When the resultant acceleration Gc is not less than the predetermined value Gt (No in S1702), the setting unit 720 sets the target current It of when the jump flag is OFF (S1703). It is a processing at the OFF time setting unit 127 of setting the target current It of normal traveling.

Meanwhile, when the resultant acceleration Gc is less than the predetermined value Gt (Yes in S1702), the setting unit 720 determines whether the length Lf of the suspension 21 is longer than the predetermined length Lf1 (S1704). When the length Lf is longer than the predetermined length Lf1 (Yes in S1704), the setting unit 720 determines whether the length Lr of the suspension 22 is longer than the predetermined length Lr1 (S1705). When the length Lr is longer than the predetermined length Lr1 (Yes in S1705), the setting unit 720 sets the jump flag to ON (S1706). Thereafter, the setting unit 720 sets a predetermined ON time current Ij as the target current It (S1707). The processes of S1702, S1704, and S1705 are processes performed by the determination unit 721. That is, when the resultant acceleration Gc is less than the predetermined value Gt, the length Lf is longer than the predetermined length Lf1, and the length Lr is longer than the predetermined length Lr1, the determination unit 721 determines that the motorcycle 600 is jumping.

When the length Lf is no longer than the predetermined length Lf1 (No in S1704), the setting unit 720 sets the target current It of when the jump flag is OFF (S1703). When the length Lr is not longer than the predetermined length Lr1 (No in S1705), the setting unit 720 sets the target current It of when the jump flag is OFF (S1703).

On the other hand, when the jump flag is ON (Yes in S1701), it is determined whether to set the jump flag to OFF (S1708). It is a processing at the OFF determination unit 123 of determining whether to set the jump flag to OFF. When it is determined to set the jump flag to OFF (Yes in S1708), the setting unit 720 sets the jump flag to OFF (S1709). It is a processing at the flag OFF unit 124 of setting the jump flag to OFF. When the condition for setting the jump flag to OFF is not satisfied (No in S1708), the setting unit 720 sets the ON time current Ij as the target current It (S1707).

As described above, in addition to the value of the resultant acceleration Gc, the control device 700 determines whether the vehicle is jumping also considering the length between the vehicle body 10 and the wheel. That is, when determining that the resultant acceleration Gc is less than the predetermined value Gt, the control device 700 determines whether the length Lf is longer than the predetermined length Lf1. Then, when it is determined that the length Lf is longer than the predetermined length Lf1, the control device 700 further determines whether the length Lr is longer than the predetermined length Lr1. Then, when the length Lr is longer than the predetermined length Lr1, the control device 700 sets the jump flag to ON. As such, according to the control device 700, it is possible to determine whether the vehicle is jumping with high accuracy.

Figure 18:
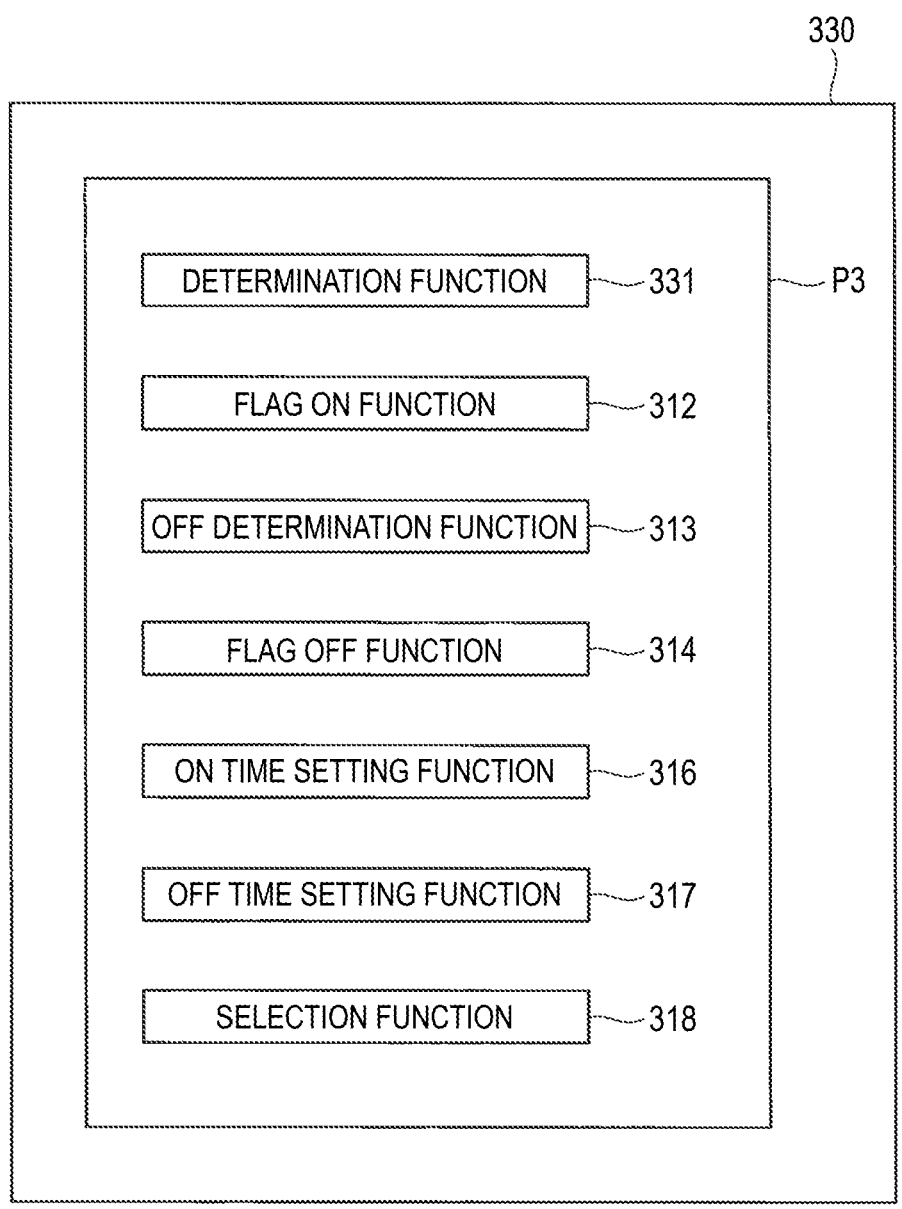
FIG. 18 is a view illustrating a schematic configuration of a recording medium 330 according to the third embodiment.

FIG. 18 is a view illustrating a schematic configuration of a recording medium 330 according to the third embodiment. The recording medium 330 is a non-transitory computer readable recording medium which records a program P3 that causes a computer to implement the function of controlling the damping force of the damping device 200.

As illustrated in FIG. 18, the recording medium 330 according to the present embodiment stores a program P3.

The program P3 has a determination function 331 of determining whether the motorcycle 600 is jumping, and a flag ON function 312 of setting the jump flag to ON in a predetermined recording area when the determination function 331 determines that the vehicle is jumping.

The program P3 has an OFF determination function 313, a flag OFF function 314, an ON time setting function 316, an OFF time setting function 317, and a selection function 318.

The determination function 331 is a module that implements the function of the determination unit 721 illustrated in FIG. 16.

As described above, the recording medium 330 is a non-transitory computer readable recording medium which records the program P3 that causes a computer to implement the function of controlling the damping force of the damping device 200. The recorded program P3 causes the computer to implement the function of determining whether the vehicle is jumping also considering the length between the vehicle body 10 and the wheel, in addition to the value of the resultant acceleration Gc.

The determination unit 721 may determine that the motorcycle 600 is jumping when a period of the resultant acceleration Gc being less than the predetermined value Gt, of the length Lf being longer than the predetermined length Lf1, and of the length Lr being longer than the predetermined length Lr1, continues for a predetermined period. The determination unit 721 may determine that the motorcycle 600 is jumping when a period of the square value of the resultant acceleration Gc being less than the square value of the predetermined value Gt, of the length Lf being longer than the predetermined length Lf1, and of the length Lr being longer than the predetermined length Lr1, continues for a predetermined period.

Fourth Embodiment

Figure 19:
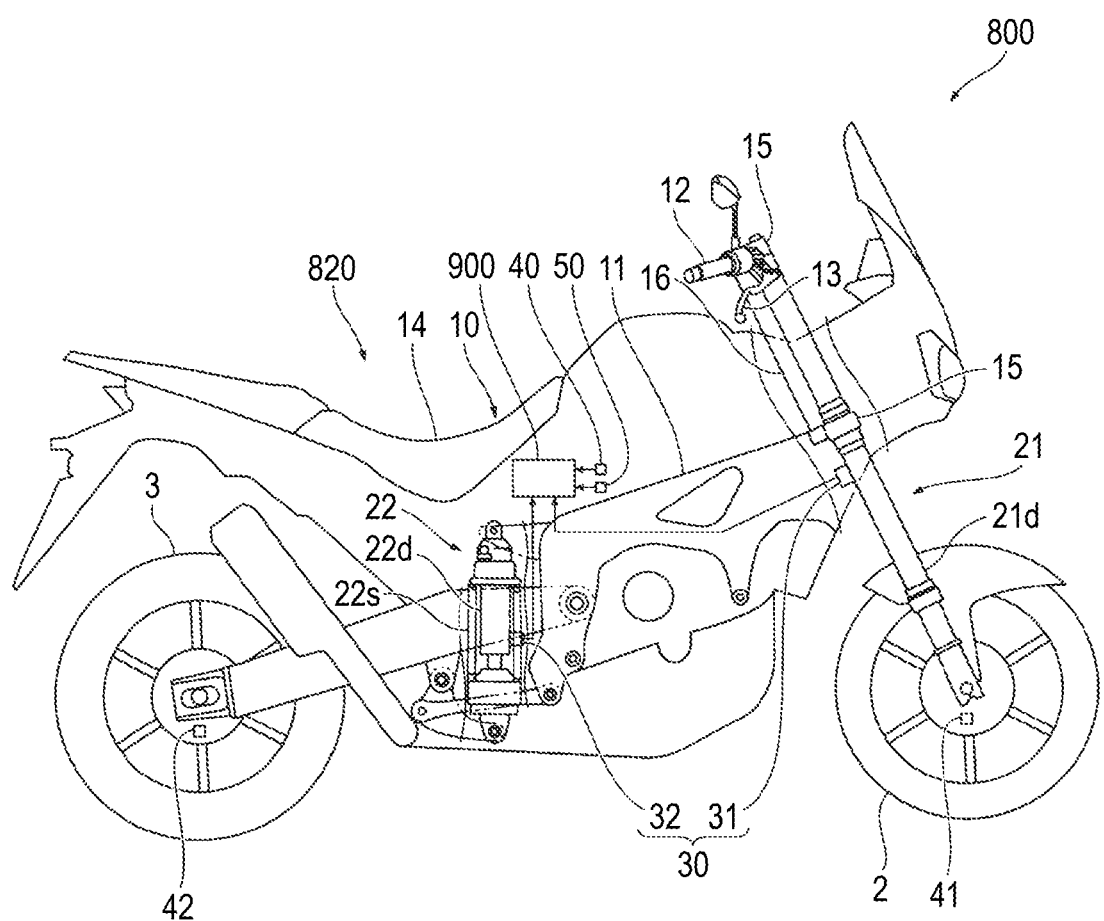
FIG. 19 is a view illustrating a schematic configuration of a motorcycle 800 according to a fourth embodiment.

FIG. 19 is a view illustrating a schematic configuration of a motorcycle 800 according to a fourth embodiment.

Figure 20:
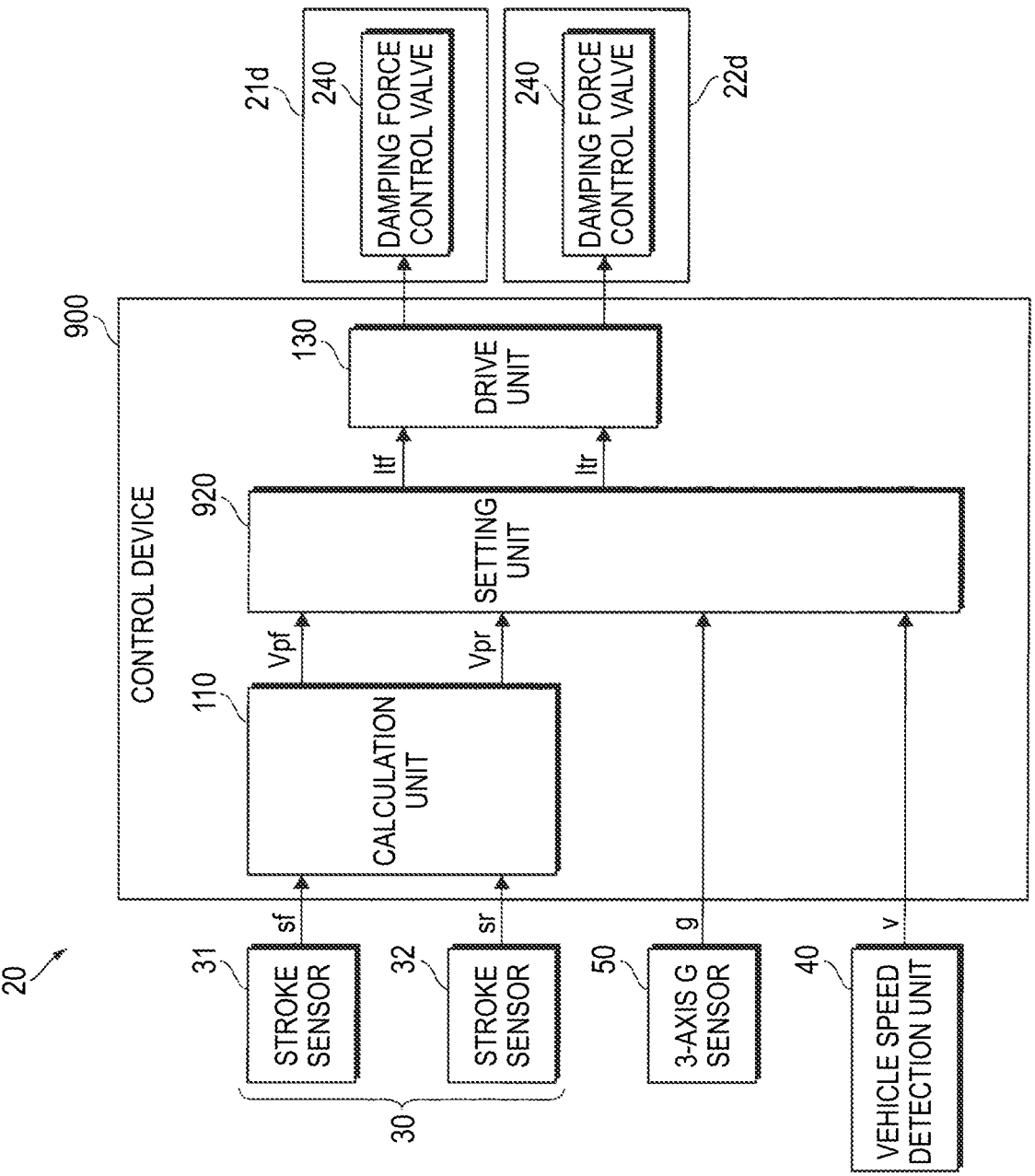
FIG. 20 is a view illustrating a schematic configuration of a control device 900 according to the fourth embodiment.

FIG. 20 is a diagram illustrating a schematic configuration of a control device 900 according to the fourth embodiment.

Figure 21:
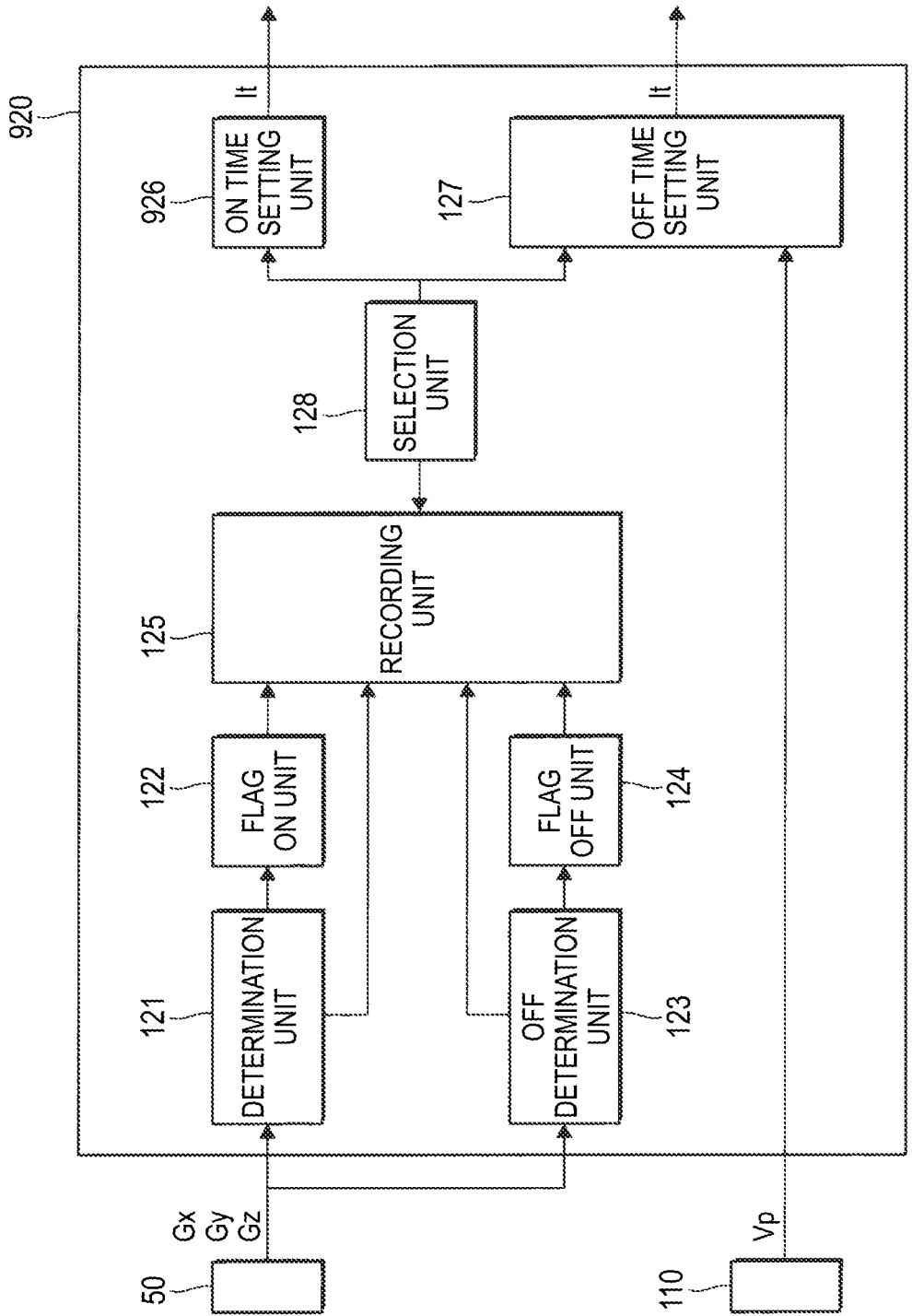
FIG. 21 is a diagram illustrating a schematic configuration of a setting unit 920 according to the fourth embodiment.

FIG. 21 is a diagram illustrating a schematic configuration of a setting unit 920 according to the fourth embodiment.

The motorcycle 800 according to the fourth embodiment is different from the motorcycle 1 according to the first embodiment in view of a configuration corresponding to the ON time setting unit 126. Hereinafter, differences from motorcycle 1 will be described. Between the motorcycle 1 and the motorcycle 800, components having the same shapes and functions are denoted by the same reference numerals, and a detailed description thereof will be omitted.

As illustrated in FIG. 19, a motorcycle 800 according to the fourth embodiment includes a control device 900 that controls the damping force of the damping devices 21d and 22d. A suspension device 820 according to the present invention is a device having suspensions (the suspension 21 and the suspension 22) and a control device 900.

As illustrated in FIG. 20, the control device 900 includes a calculation unit 110, a setting unit 920, and a drive unit 130. The setting unit 920 receives not only the stroke speeds Vpf and Vpr calculated by the calculation unit 110 and the output signal g from the 3-axis G sensor 50, but also an output signal v from the vehicle speed measurement unit 40 that measures the vehicle speed Vc, which is the moving speed of the motorcycle 800. The vehicle speed measurement unit 40 measures the vehicle speed Vc based on output values from a rotation angle measurement sensor 41 that measures the rotation angle of the front wheel 2 and a rotation angle measurement sensor 42 that measures the rotation angle of the rear wheel 3.

As illustrated in FIG. 21, the setting unit 920 includes a determination unit 121, a flag ON unit 122, an OFF determination unit 123, a flag OFF unit 124, and a recording unit 125.

The setting unit 920 includes an ON time setting unit 926 that sets a target current It to be supplied to the solenoid of the damping force control valve 240 when the jump flag is ON. The setting unit 920 includes an OFF time setting unit 127 and a selection unit 128.

Figure 22:
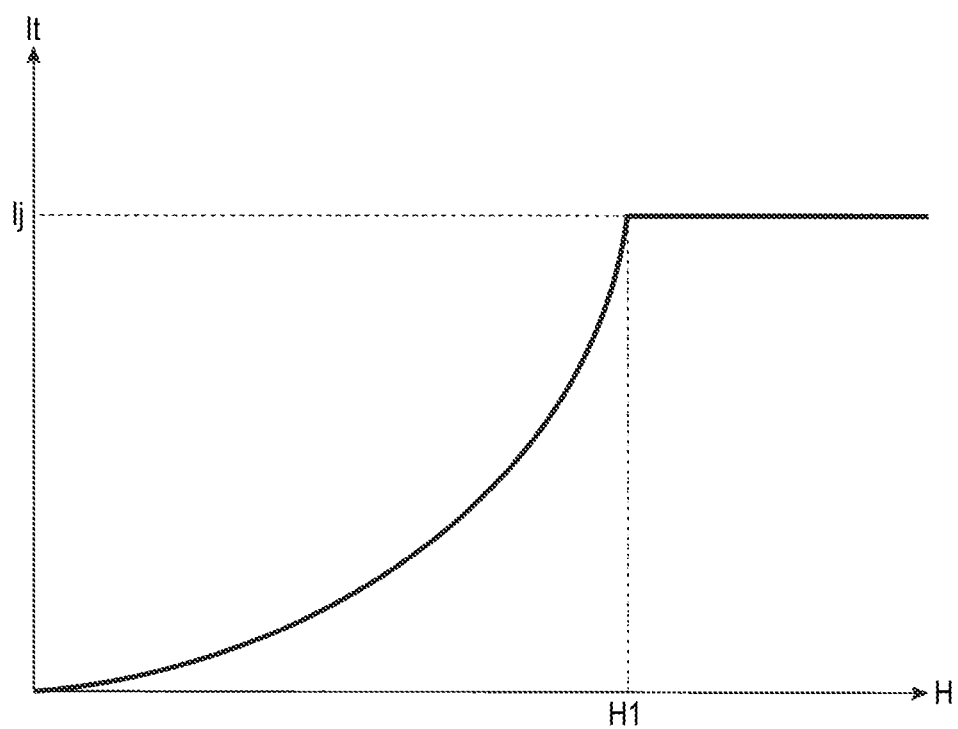
FIG. 22 is a view illustrating an example of the relationship between the height of the jump of the motorcycle and the target current It set by the ON time setting unit.

FIG. 22 is a diagram illustrating an example of the relationship between a height H of a jump of the motorcycle 800 and the target current It set by the ON time setting unit 926.

The ON time setting unit 926 estimates the height H of the jump of the motorcycle 800 (the height from the peak point of the jump to the landing point), and sets the target current It according to the estimated height H. The higher the height H of the jump of the motorcycle 800, the greater the energy to be absorbed by the suspension device 820 at the time of landing. Therefore, the ON time setting unit 926 increases the target current It in order to increase the damping force of the damping device 200, as the height H of the jump of the motorcycle 800 is higher. For example, the ON time setting unit 926 substitutes the estimated height H into the control map illustrated in FIG. 22 illustrating the relationship between the target current It and the height H of the jump, which is heuristically created in advance and recorded in the ROM, to calculate the target current It. In the control map illustrated in FIG. 22, it is configured such that, when the height H of the jump is equal to or less than the predetermined height H1, the amount of current increases as the height H of the jump increases, and when the height H of the jump is higher than the predetermined height H1, it is the ON time current Ij. The relationship between the target current It and the height H of the jump when the height H of the jump is equal to or less than the predetermined height H1 is represented by a downward convex curve as illustrated in FIG. 22. Also in the fourth embodiment, when it is determined that the vehicle is jumping, the damping force of the damping device 200 is increased greater than the damping force generated when it is not determined that the vehicle is jumping.

The ON time setting unit 926 may estimate the height H of the jump using the duration of the jump, for example. For example, the ON time setting unit 926 may measure the time during which the resultant acceleration Gc for which the acceleration Gx, the acceleration Gy and the acceleration Gz measured by the 3-axis G sensor 50 are combined is less than the predetermined value Gt to estimate the height H of the jump using the measured time (duration). The duration from the start of the jump to the landing equals Tup+Tdn, where Tup is an up duration which is a duration from the start of the jump to the peak point of the jump, and Tdn is a down duration which is a duration from the peak point to the landing. When the height from the jump start point to the peak point is H0, H0=gravitational acceleration×Tup$^2$/2. The height H of the jump (the height from the peak point of the jump to the landing point)=gravitational acceleration× Tdn$^2$/2. When it is assumed that Tup and Tdn are equal, Tdn=(measured time)/2. Therefore, the ON time setting unit 926 may estimate that the height H of the jump=gravitational acceleration×((measured time)/2)$^2$/2=gravitational acceleration×(measured time)$^2$/8. However, when the start point of jump and the peak point are the same as each other, the measured duration is substantially the same as the falling time Tdn. Therefore, when the inclination angle of the road immediately before jumping is 0, the ON time setting unit 926 may set the height of the jump as H=gravitational acceleration×(measured time)$^2$/2. The ON time setting unit 926 may exemplify that the inclination angle of the uphill slope is estimated using the acceleration Gx. The ON time setting unit 926 may estimate the height H of the jump using the inclination angle of the uphill slope and the vehicle speed Vc which is the moving speed of the motorcycle 800 immediately before jumping. The ON time setting unit 926 may exemplify that the inclination angle of the uphill slope is estimated using the acceleration Gx.

Next, the procedure of the target current setting processing performed by the setting unit 920 will be described using a flowchart.

Figure 23:
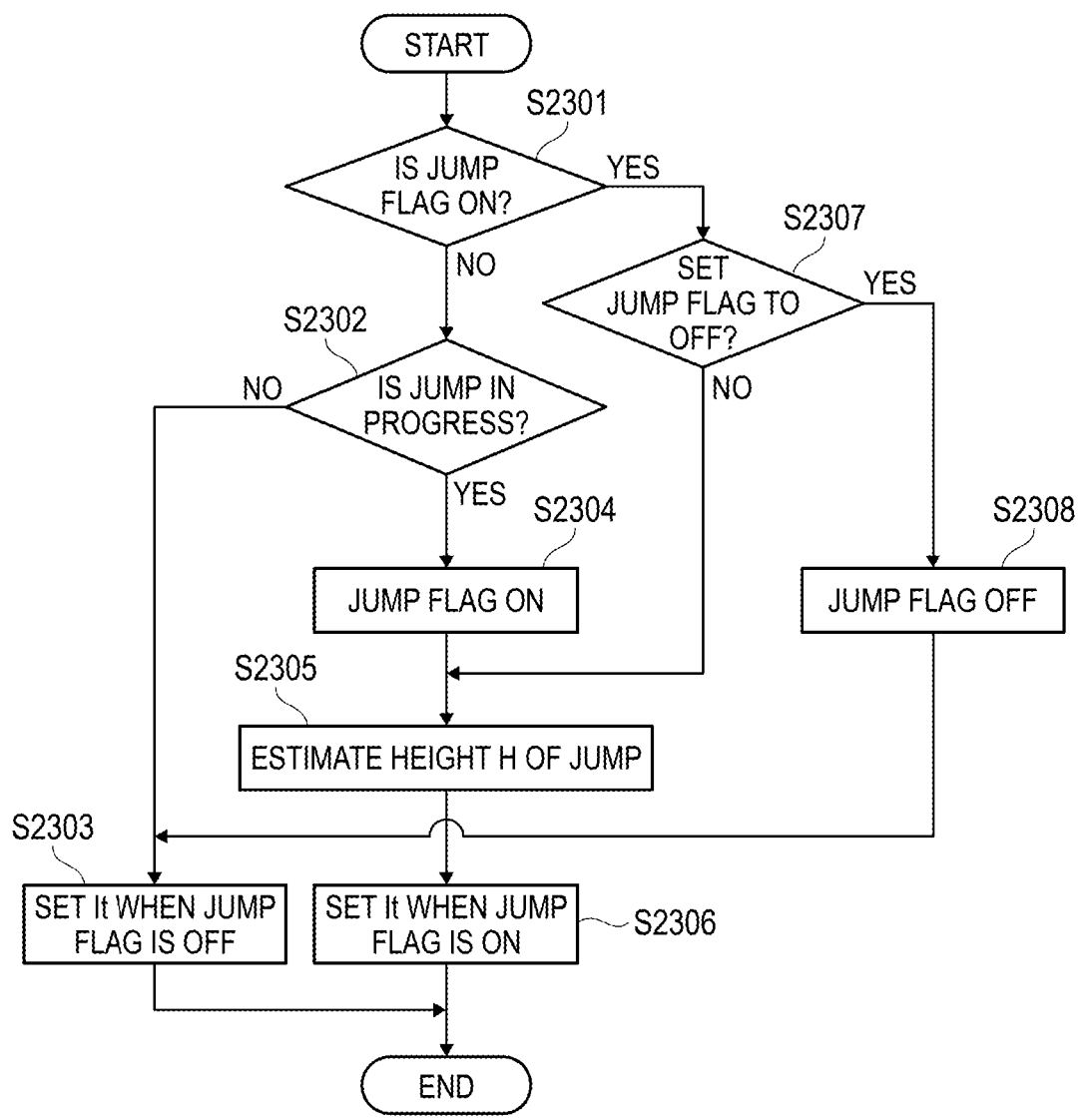
FIG. 23 is a flowchart illustrating a procedure of target current setting processing performed by the setting unit 920.

FIG. 23 is a flowchart illustrating the procedure of the target current setting processing performed by the setting unit 920.

The setting unit 920 repeatedly executes this target current setting processing every predetermined period (for example, 1 millisecond).

The setting unit 920 determines whether the jump flag is ON (S2301). When the jump flag is OFF (No in S2301), the setting unit 920 determines whether the vehicle is jumping (S2302). When the vehicle is not jumping (No in S2302), the setting unit 920 sets the target current It of when the jump flag is OFF (S2303).

On the other hand, when the vehicle is jumping (Yes in S2302), the setting unit 920 sets the jump flag to ON (S2304). Thereafter, the setting unit 920 estimates the height H of the jump (S2305). This is a processing at the ON time setting unit 926 of estimating using the method described above. Thereafter, the setting unit 920 sets the target current It of when the jump flag is ON, using the height H of the jump estimated in S2305 (S2306). This is a processing at the ON time setting unit 926 of setting the target current It using the height H of the jump estimated in S2305 and the control map illustrated in FIG. 22, for example.

On the other hand, when the jump flag is ON (Yes in S2301), it is determined whether to set the jump flag to OFF (S2307). When it is determined to set the jump flag to OFF (Yes in S2307), the setting unit 920 sets the jump flag to OFF (S2308). Thereafter, the setting unit 920 sets the target current It of when the jump flag is OFF (S2303). Meanwhile, when it is not determined to set the jump flag to OFF (No in S2307), the setting unit 920 performs the processing of S2305 and subsequent steps.

As described above, when the determination unit 121 determines that the vehicle is jumping, the control device 900 increases the magnitude of the damping force of the damping device 200 greater than the damping force generated when it is not determined that the vehicle is jumping, and further changes the magnitude of the damping force of the damping device 200 according to the height H of the jump. That is, the control device 900 estimates the height H of the jump, and then using the estimated height H of the jump, sets the target current It of when the jump flag is ON. For example, by setting the target current It based on the relationship between the height H of the jump and the target current It illustrated in FIG. 22, it is possible to further increase the damping force at the time of landing from a jump, as the height H of the jump is higher. When the height H of the jump is low, the target current It may be set such that the damping force is increased to be greater than the damping force generated during normal traveling when the vehicle is not jumping, and the damping force is decreased to be less than that when the height H of the jump is higher. As a result, according to the control by the control device 900, when the height H of the jump is high, the steering performance at the time of landing from a jump can be improved, and when the height H of the jump is low, it is possible not to deteriorate the ride comfort at the time of landing from a jump.

Figure 24:
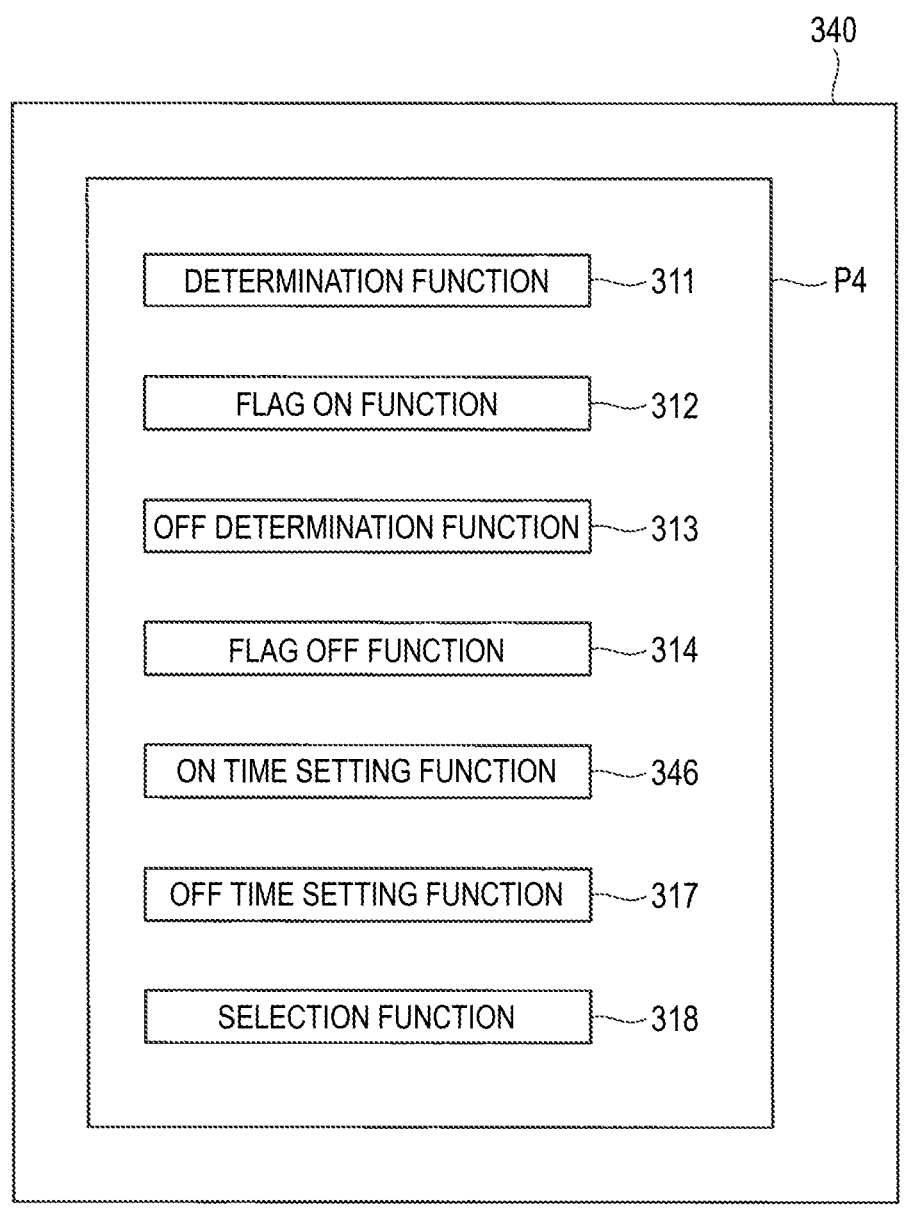
FIG. 24 is a view illustrating a schematic configuration of a recording medium 340 according to the fourth embodiment.

FIG. 24 is a view illustrating a schematic configuration of a recording medium 340 according to the fourth embodiment. The recording medium 340 is a non-transitory computer readable recording medium storing a program P4 that causes a computer to implement the function of controlling the damping force of the damping device 200.

As illustrated in FIG. 24, the recording medium 340 according to the present embodiment stores a program P4.

The program P4 has a determination function 311, a flag ON function 312, an OFF determination function 313, and a flag OFF function 314.

The program P4 has an ON time setting function 346, an OFF time setting function 317, and a selection function 318 for setting the target current It to be supplied to the solenoid of the damping force control valve 240 when the jump flag is ON.

The ON time setting function 346 is a module that implements the function of the ON time setting unit 926 illustrated in FIG. 21.

As described above, the recording medium 340 is a non-transitory computer readable recording medium which records a program P4 that causes a computer to implement the function of controlling the damping force of the damping device 200. The recorded program P4 causes the computer to implement the function of changing the magnitude of the damping force of the damping device 200 according to the height H of the jump.

Although the ON time setting unit 926 of the control device 900 estimates the height H of the jump and according to the estimated height H of the jump, sets the target current It of when the jump flag is ON, the present invention is not limited to such an embodiment. The ON time setting unit 926 may set the target current It of when the jump flag is ON, using the following method.

Figure 25:
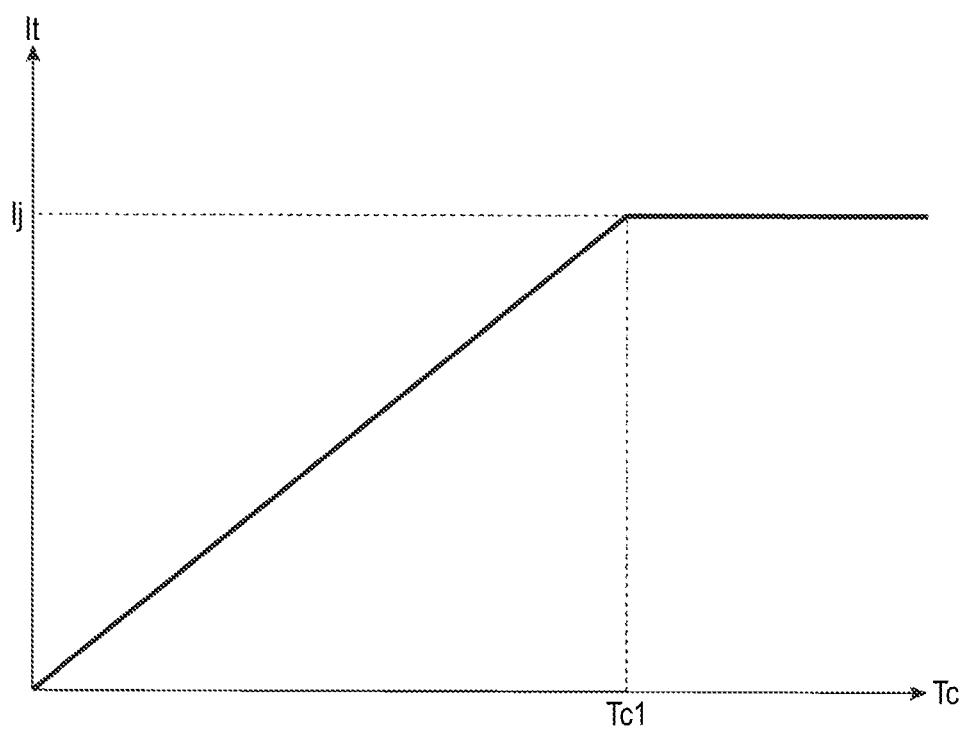
FIG. 25 is a view illustrating an example of the relationship between the duration of the jump of the motorcycle and the target current It set by the ON time setting unit.

FIG. 25 is a view illustrating an example of the relationship between the duration Tc of the jump of the motorcycle 800 and the target current It set by the ON time setting unit 926.

The ON time setting unit 926 may set the target current It according to the duration Tc of the jump of the motorcycle 800. In view of the fact that the longer the duration Tc of the jump is, the larger the energy to be absorbed by the suspension device 820 at the time of landing is, the ON time setting unit 926 increases the target current It in order to increase the damping force of the damping device 200 as the jump duration Tc increases.

For example, the ON time setting unit 926 substitutes the duration Tc into the control map illustrated in FIG. 25 illustrating the relationship between the target current It and the duration Tc, which is heuristically created in advance and recorded in the ROM, to calculate the target current It. In the control map illustrated in FIG. 25, it is configured such that, when the duration Tc is equal to or less than the predetermined time Tc1, the amount of current increases as the duration Tc increases, and when the continuation time Tc is longer than the predetermined time Tc1, it is the ON time current Ij.

Figure 26:
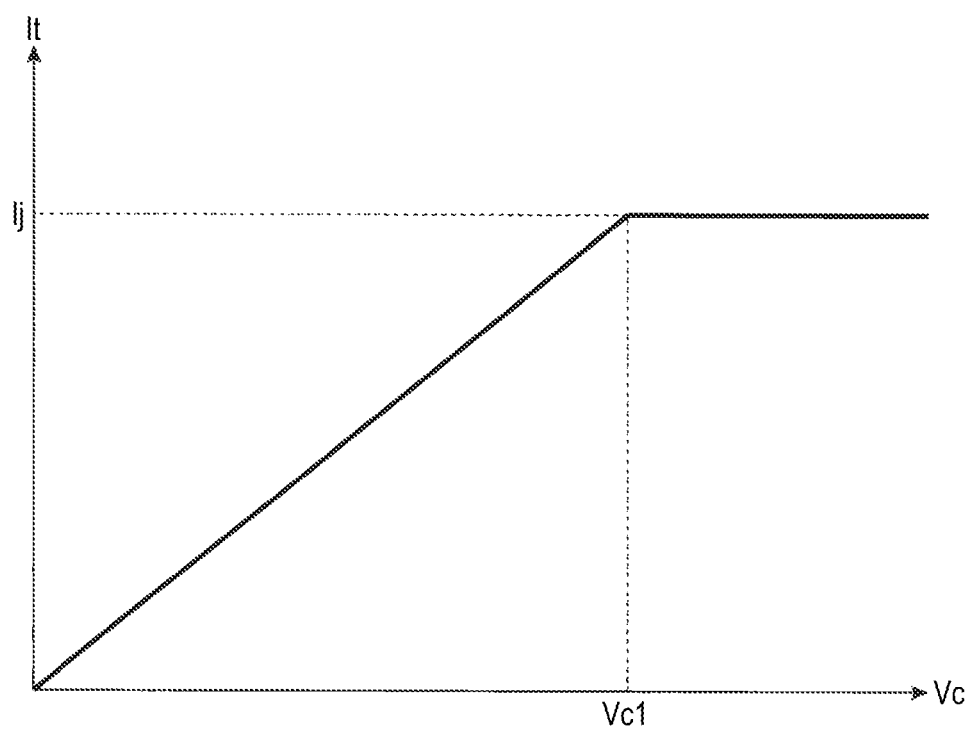
FIG. 26 is a view illustrating an example of the relationship between the vehicle speed of the motorcycle and the target current set by the ON time setting unit.

FIG. 26 is a view illustrating an example of the relationship between the vehicle speed Vc of the motorcycle 800 and the target current It set by the ON time setting unit 926.

The ON time setting unit 926 may set the target current It according to the vehicle speed Vc immediately before the jump of the motorcycle 800. In view of the fact that the energy to be absorbed by the suspension device 820 at the time of landing increases as the vehicle speed Vc immediately before the jump of the motorcycle 800 increases, the ON time setting unit 926 increases the target current It in order to increase the damping force of the damping device 200 as the vehicle speed Vc before the jump of the motorcycle 800 increases. The vehicle speed Vc immediately before the jump may be exemplified as the vehicle speed Vc when the resultant acceleration Gc for which the acceleration Gx, the acceleration Gy and the acceleration Gz measured by the 3-axis G sensor 50 are combined is less than the predetermined value Gt.

For example, the ON time setting unit 926 substitutes the vehicle speed Vc into the control map illustrated in FIG. 26 illustrating the relationship between the target current It and the vehicle speed Vc, which is heuristically created in advance and recorded in the ROM, to calculate the target current It. In the control map illustrated in FIG. 26, it is configured such that, when the vehicle speed Vc is equal to or less than the predetermined speed Vc1, the amount of current increases as the vehicle speed Vc increases, and when the vehicle speed Vc is greater than the predetermined speed Vc1, it is the ON time current Ij.

Note that, when the jump flag is ON, for increasing the damping force of the damping device 200 compared to that when the jump flag is OFF, the setting unit 920 may set the damping force of the damping device 21d on the front wheel side greater than the damping force of the damping device 22d on the rear wheel side. That is, the ON time setting unit 926 of the setting unit 920 may set the target current It that is set when the jump flag is ON such that the damping force of the damping device 21d on the front wheel side is greater than the damping force of the damping device 22d on the rear wheel side. When landing from a jump, since it is necessary to absorb a large amount of energy on both the front wheel side and the rear wheel side, it is effective to increase the damping force of the damping device 200 on both the front wheel side and the rear wheel side. Then, at the time of landing, it is considered that landing from the front wheel 2 is more likely in many cases, and accordingly, by having the damping force of the damping device 21d on the front wheel side greater than the damping force of the damping device 22d on the rear wheel side, it is possible to suppress the deterioration of the ride comfort while absorbing a large amount of energy.

Note that the ON time setting unit 926 may be adapted instead of the ON time setting unit 126 of the setting unit 520 according to the second embodiment and the ON time setting unit 126 of the setting unit 720 according to the third embodiment.

REFERENCE SIGNS LIST 1, 400, 600, 800: motorcycle
2: front wheel
3: rear wheel
21: suspension on the front wheel side
22: suspension on the rear wheel side
100, 500, 700, 900: control device
110: calculation unit
120, 520, 720, 920: setting unit
121, 521, 721: determination unit
126, 926: ON time setting unit
130: drive unit
200: damping device
240: damping force control valve

The invention claimed is:

1. A suspension device comprising:
a damping device that damps a force generated between a vehicle body and a wheel of a vehicle;
a determination unit that determines whether the vehicle is jumping, using an acceleration of the vehicle in a front-rear direction, an acceleration of the vehicle in a left-right direction, and an acceleration of the vehicle in a vertical direction; and
a damping force control unit that increases a damping force of the damping device such that the damping force generated when the determination unit determines that the vehicle is jumping is greater than the damping force generated when the determination unit does not determine that the vehicle is jumping, wherein
the determination unit determines whether the vehicle is jumping by further considering a length between the vehicle body and the wheel.

2. The suspension device according to claim 1, wherein the determination unit determines that the vehicle is jumping when a square value $Gx^2+Gy^2+Gz^2$ of a resultant acceleration for which the acceleration Gx in the front-rear direction, the acceleration Gy in the left-right direction, and the acceleration Gz in the vertical direction are combined is less than a predetermined value, or when a period of the square value $Gx^2+Gy^2+Gz^2$ of the resultant acceleration being less than the predetermined value continues for a predetermined period.

3. The suspension device according to claim 2, wherein at a time of jumping when the determination unit determines that the vehicle is jumping, the damping force control unit increases the damping force in a compression direction such that a relative displacement between the vehicle body and the wheel is less than the relative displacement at a time of normal traveling when the determination unit does not determine that the vehicle is jumping.

4. The suspension device according to claim 3, wherein until a predetermined reference period elapses after landing from a jump of the vehicle, the damping force control unit increases the damping force in an extension direction in which the relative displacement between the vehicle body and the wheel is greater than the relative displacement at the time of the normal traveling.

5. The suspension device according to claim 2, wherein the damping force control unit varies a magnitude of the damping force of the damping device according to a height of the jump.

6. The suspension device according to claim 2, wherein
the damping force control unit stops increasing the damping force of the damping device when a predetermined reference period elapses after landing from a jump of the vehicle.

7. The suspension device according to claim 2, wherein
at a time of jumping when the determination unit determines that the vehicle is jumping, the damping force control unit increases the damping force of the damping device on a front wheel side and the damping device on a rear wheel side such that the damping force of the damping device on the front wheel side is greater than the damping force of the damping device on the rear wheel side.

8. The suspension device of claim 1, wherein
at a time of jumping when the determination unit determines that the vehicle is jumping, the damping force control unit increases the damping force in a compression direction such that a relative displacement between the vehicle body and the wheel is less than the relative displacement at a time of normal traveling when the determination unit does not determine that the vehicle is jumping.

9. The suspension device of claim 1, wherein
the damping force control unit varies a magnitude of the damping force of the damping device according to a height of the jump.

10. The suspension device of claim 1, wherein
the damping force control unit stops increasing the damping force of the damping device when a predetermined reference period elapses after landing from a jump of the vehicle.

11. The suspension device according to claim 1, wherein
at a time of jumping when the determination unit determines that the vehicle is jumping, the damping force control unit increases the damping force of the damping device on a front wheel side and the damping device on a rear wheel side such that the damping force of the damping device on the front wheel side is greater than the damping force of the damping device on the rear wheel side.

12. A suspension device comprising:
a damping device that damps a force generated between a vehicle body and a wheel of a vehicle;
a determination unit that determines whether the vehicle is jumping, using an acceleration of the vehicle in a front-rear direction, an acceleration of the vehicle in a left-right direction, and an acceleration of the vehicle in a vertical direction; and
a damping force control unit that increases a damping force of the damping device such that the damping force generated when the determination unit determines that the vehicle is jumping is greater than the damping force generated when the determination unit does not determine that the vehicle is jumping, wherein
at a time of jumping when the determination unit determines that the vehicle is jumping, the damping force control unit increases the damping force in a compression direction such that a relative displacement between the vehicle body and the wheel is less than the relative displacement at a time of normal traveling when the determination unit does not determine that the vehicle is jumping, and
until a predetermined reference period elapses after landing from a jump of the vehicle, the damping force control unit increases the damping force in an extension direction in which the relative displacement between the vehicle body and the wheel is greater than the relative displacement at the time of the normal traveling.

13. A non-transitory computer readable recording medium storing a program that causes a computer to implement:
a function of determining whether a vehicle is jumping, using an acceleration of the vehicle in a front-rear direction, an acceleration of the vehicle in a left-right direction, and an acceleration of the vehicle in a vertical direction; and
a function of increasing a damping force of a damping device that damps a force generated between a vehicle body and a wheel of the vehicle such that the damping force generated when it is determined that the vehicle is jumping is greater than the damping force generated when it is not determined that the vehicle is jumping, wherein
a length between the vehicle body and the wheels is further considered in determining whether the vehicle is jumping.

* * * * *